United States Patent
Erni et al.

(10) Patent No.: US 9,411,769 B2
(45) Date of Patent: Aug. 9, 2016

(54) APPARATUS AND METHODS TO COMMUNICATIVELY COUPLE FIELD DEVICES TO CONTROLLERS IN A PROCESS CONTROL SYSTEM

(71) Applicant: Fisher-Rosemount Systems, Inc., Round Rock, TX (US)

(72) Inventors: Klaus Erni, Austin, TX (US); Gary Keith Law, Georgetown, TX (US); Doyle Eugene Broom, Georgetown, TX (US); Kent Allan Burr, Round Rock, TX (US); Mark J. Nixon, Round Rock, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 0 days.

(21) Appl. No.: 14/592,354

(22) Filed: Jan. 8, 2015

(65) Prior Publication Data

US 2015/0127876 A1 May 7, 2015

Related U.S. Application Data

(63) Continuation-in-part of application No. 14/170,072, filed on Jan. 31, 2014, which is a continuation of application No. 13/709,974, filed on Dec. 10, 2012, now Pat. No. 8,762,618, which is a continuation of application No. 11/533,259, filed on Sep. 19, 2006, now Pat. No. 8,332,567.

(51) Int. Cl.
*G05B 19/418* (2006.01)
*G06F 13/42* (2006.01)
(Continued)

(52) U.S. Cl.
CPC ............ *G06F 13/4282* (2013.01); *G05B 15/02* (2013.01); *G05B 19/042* (2013.01);
(Continued)

(58) Field of Classification Search
CPC . G06F 13/4027; G06F 13/385; G06F 13/387; G06F 13/4059; G06F 3/0661; G05B 19/418
See application file for complete search history.

(56) References Cited

U.S. PATENT DOCUMENTS 4,964,120 A 10/1990 Mostashari
4,982,371 A 1/1991 Bolan et al.
(Continued)

FOREIGN PATENT DOCUMENTS

CN 1170464 1/1998
CN 1417654 5/2003
(Continued)

OTHER PUBLICATIONS

Hoon et al., "Foundation Fieldbus High Speed Ethernet (HSE) Implementation," International Symposium on Intelligent Control, IEEE, Oct. 27-30, 2002, 6 pages.
(Continued)

*Primary Examiner* — Farley Abad
(74) *Attorney, Agent, or Firm* — Hanley, Flight & Zimmerman, LLC

(57) ABSTRACT

A disclosed example apparatus includes a first interface to be communicatively coupled to one of a first field device or a second field device. The first interface communicates using a first fieldbus communication protocol when coupled to the first field device and communicates using a second fieldbus communication protocol when coupled to the second field device. The example apparatus includes a communication processor to encode first information received from the one of the first field device or the second field device for communication via a bus using a third communication protocol. The example apparatus includes a second interface communicatively coupled to the communication processor and the bus to communicate the first information to a controller in the process control system. The bus is to use the third communication protocol to communicate second information received from the other one of the first field device or the second field device.

19 Claims, 18 Drawing Sheets

(51) Int. Cl.
  *G05B 15/02* (2006.01)
  *G06F 13/36* (2006.01)
  *G05B 19/042* (2006.01)
  *H04L 12/413* (2006.01)
  *H04L 12/64* (2006.01)

(52) U.S. Cl.
  CPC ............ *G05B19/4185* (2013.01); *G06F 13/36* (2013.01); *H04L 12/413* (2013.01); *H04L 12/6418* (2013.01); *G05B 2219/25139* (2013.01); *G05B 2219/25458* (2013.01); *G05B 2219/31121* (2013.01); *G05B 2219/31129* (2013.01); *G05B 2219/34421* (2013.01); *Y02P 90/18* (2015.11)

(56) References Cited

U.S. PATENT DOCUMENTS

| | | | |
|---|---|---|---|
| 5,158,464 A | 10/1992 | Landrini | |
| 5,339,425 A | 8/1994 | Vanderah et al. | |
| 5,422,634 A | 6/1995 | Okubo | |
| 5,432,711 A | 7/1995 | Jackson et al. | |
| 5,573,032 A | 11/1996 | Lenz et al. | |
| 5,682,476 A | 10/1997 | Tapperson et al. | |
| 5,706,007 A | 1/1998 | Fragnito et al. | |
| 5,793,963 A | 8/1998 | Tapperson et al. | |
| 5,796,721 A | 8/1998 | Gretta, Jr. | |
| 5,828,851 A | 10/1998 | Nixon et al. | |
| 5,844,601 A | 12/1998 | McPheely et al. | |
| 5,901,323 A | 5/1999 | Milliken et al. | |
| 5,923,557 A | 7/1999 | Eidson | |
| 5,970,430 A | 10/1999 | Burns et al. | |
| 5,991,530 A | 11/1999 | Okada et al. | |
| 6,008,985 A | 12/1999 | Lake et al. | |
| 6,012,096 A | 1/2000 | Link et al. | |
| 6,016,523 A | 1/2000 | Zimmerman et al. | |
| 6,034,970 A | 3/2000 | Levac et al. | |
| 6,044,407 A | 3/2000 | Jones et al. | |
| 6,047,219 A | 4/2000 | Eidson | |
| 6,047,222 A | 4/2000 | Burns et al. | |
| 6,055,633 A | 4/2000 | Schrier et al. | |
| 6,095,850 A | 8/2000 | Liu | |
| 6,097,303 A | 8/2000 | Lunz et al. | |
| 6,098,116 A | 8/2000 | Nixon et al. | |
| 6,098,891 A | 8/2000 | Guthery et al. | |
| 6,192,281 B1 | 2/2001 | Brown et al. | |
| 6,222,855 B1 | 4/2001 | Kimber et al. | |
| 6,233,626 B1 | 5/2001 | Swales et al. | |
| 6,255,988 B1 | 7/2001 | Bischoff | |
| 6,266,726 B1 | 7/2001 | Nixon et al. | |
| 6,272,575 B1 | 8/2001 | Rajchel | |
| 6,366,951 B1 | 4/2002 | Schmidt | |
| 6,374,315 B1 | 4/2002 | Okada et al. | |
| 6,397,225 B1 | 5/2002 | Brown et al. | |
| 6,425,038 B1 | 7/2002 | Sprecher | |
| 6,434,157 B1 | 8/2002 | Dube et al. | |
| 6,446,202 B1 | 9/2002 | Krivoshein et al. | |
| 6,449,715 B1 | 9/2002 | Krivoshein | |
| 6,453,687 B2 | 9/2002 | Sharood et al. | |
| 6,567,915 B1 | 5/2003 | Guthery | |
| 6,618,630 B1 | 9/2003 | Jundt et al. | |
| 6,711,698 B1 | 3/2004 | Marbach et al. | |
| 6,738,388 B1 | 5/2004 | Stevenson et al. | |
| 6,904,327 B2 | 6/2005 | Balakrishnan et al. | |
| 6,934,862 B2 | 8/2005 | Sharood et al. | |
| 6,959,356 B2 | 10/2005 | Packwood et al. | |
| 6,970,003 B2* | 11/2005 | Rome | G01R 31/2829 324/713 |
| 7,024,508 B2 | 4/2006 | Gros et al. | |
| 7,039,675 B1 | 5/2006 | Kato | |
| 7,246,194 B2 | 7/2007 | Train et al. | |
| 7,309,260 B2 | 12/2007 | Brower et al. | |
| 7,716,386 B1 | 5/2010 | Vasquez et al. | |
| 8,332,567 B2 | 12/2012 | Burr et al. | |
| 8,761,196 B2 | 6/2014 | Law et al. | |
| 2002/0019891 A1 | 2/2002 | Morrow et al. | |
| 2002/0064011 A1* | 5/2002 | Loechner | G05B 19/0428 361/92 |
| 2002/0183863 A1 | 12/2002 | Eryurek | |
| 2002/0184410 A1* | 12/2002 | Apel | G06F 9/4411 710/5 |
| 2003/0014536 A1 | 1/2003 | Christensen et al. | |
| 2003/0023795 A1 | 1/2003 | Packwood et al. | |
| 2003/0030518 A1 | 2/2003 | Polese et al. | |
| 2003/0040881 A1* | 2/2003 | Steger | G06F 19/3412 702/123 |
| 2003/0099229 A1 | 5/2003 | Tretter et al. | |
| 2003/0105535 A1 | 6/2003 | Rammler | |
| 2003/0200532 A1 | 10/2003 | Gensel | |
| 2004/0111238 A1 | 6/2004 | Kantzes et al. | |
| 2004/0193290 A1 | 9/2004 | Ott et al. | |
| 2004/0199267 A1* | 10/2004 | Hammer | G05B 19/4141 700/1 |
| 2004/0260405 A1 | 12/2004 | Eddie et al. | |
| 2005/0222794 A1 | 10/2005 | Baird et al. | |
| 2005/0240675 A1 | 10/2005 | Caspers et al. | |
| 2005/0267641 A1 | 12/2005 | Nickerson et al. | |
| 2005/0288799 A1 | 12/2005 | Brewer et al. | |
| 2006/0031577 A1 | 2/2006 | Peluso et al. | |
| 2006/0160487 A1 | 7/2006 | Nam et al. | |
| 2006/0240818 A1* | 10/2006 | McCoy | H04B 7/18567 455/430 |
| 2007/0019560 A1 | 1/2007 | Brewer et al. | |
| 2007/0233323 A1 | 10/2007 | Wiemeyer et al. | |
| 2008/0004726 A1 | 1/2008 | Gehring et al. | |
| 2008/0005406 A1 | 1/2008 | Odom et al. | |
| 2008/0058964 A1 | 3/2008 | Nickerson et al. | |
| 2008/0080395 A1 | 4/2008 | Law et al. | |
| 2009/0168857 A1 | 7/2009 | Golborne et al. | |
| 2010/0077111 A1 | 3/2010 | Holmes et al. | |
| 2011/0191500 A1 | 8/2011 | Odayappan et al. | |
| 2013/0103877 A1 | 4/2013 | Burr et al. | |
| 2014/0149630 A1 | 5/2014 | Burr et al. | |

FOREIGN PATENT DOCUMENTS

| | | |
|---|---|---|
| CN | 2627745 | 7/2004 |
| CN | 2716875 | 8/2005 |
| CN | 1700125 | 11/2005 |
| EP | 0490864 | 6/1992 |
| GB | 2383476 | 6/2003 |
| JP | 63281597 | 11/1988 |
| JP | H04268604 | 9/1992 |
| JP | H08272406 | 10/1996 |
| JP | 10042380 | 2/1998 |
| JP | 11126104 | 5/1999 |
| JP | 2000214913 | 4/2000 |
| JP | 2000138725 | 5/2000 |
| JP | 2000230743 | 8/2000 |
| JP | 2002023811 | 1/2002 |
| JP | 2002369267 | 12/2002 |
| JP | 2004537820 | 12/2004 |
| WO | 97/19396 | 5/1997 |
| WO | 9919782 | 4/1999 |
| WO | 01/23971 | 4/2001 |
| WO | 0213036 | 2/2002 |
| WO | 03/013104 | 2/2003 |
| WO | 2006/076122 | 7/2006 |

OTHER PUBLICATIONS

Pal et al., "Development of Network Capable Smart Transducer Interface for Traditional Sensors and Actuators," www.sciencedirect.com, Elsevier Science B.V., Feb. 29, 2004, 7 pages.

Torero, "Total Life cycle web-integerate control," IST-2001-37573, Aug. 19, 2003, 3 pages.

Rochez, "Examples of an Industrial Fieldbus Adapter for a Custom Front-End Board," available at https://itco.web.cern.ch/itco/Projects-Services/JCOP/ProjectTeam/Minutes/1999/10-11-99/jcop991110.pdf, Oct. 11, 1999, 13 pages.

Japanese Patent Office, "Notice of Reasons for Rejection", issued in connection with Japanese patent application No. 2014-139452, mailed on May 19, 2015, 10 pages.

(56) References Cited

OTHER PUBLICATIONS

Japanese Patent Office, "Notice of Reasons for Rejection", issued in connection with Japanese patent application No. 2014-139453, mailed on May 19, 2015, 10 pages.
Gray Jr., James O., Integrating Foundation Fieldbus Into a Distributed Control System, Foundation Fieldbus in the real world, Seminar Amsterdam, Nov. 30, 2000, 35 pages.
Intellectual Property Office of Great Britain, "Examination Report," issued on Oct. 15, 2010, in Great Britain Patent Application No. GB0718038.3, 4 pages.
Intellectual Property Office of Great Britain, "Combined Search and Examination Report," issued on May 27, 2011, in Great Britain Patent Application No. GB1106342.7, 2 pages.
Intellectual Property Office of Great Britain, "Combined Search and Examination Report," issued on May 31, 2011, in Great Britain Patent Application No. GB1106344.3, 2 pages.
Intellectual Property Office of Great Britain, "Combined Search and Examination Report," issued on Jun. 1, 2011, in Great Britain Patent Application No. GB1106341.9, 3 pages.
Japanese Patent Office, "Decision of Refusal," issued in connection with Japanese Patent Application No. 2007-242221 on Dec. 3, 2013, 2 pages.
Japanese Patent Office, "Notice of Reasons for Rejection," issued on Jun. 5, 2012, in Japanese Patent Application No. 2007-242221, 6 pages.
Japanese Patent Office, "Notice of Reasons for Rejection," mailed on Feb. 5, 2013, in Japanese Patent Application No. 2007-242221, 2 pages.
Japanese Patent Office, "Notice of Reasons for Rejection," issued in connection with Japanese Patent Application No. 2012-221297 on Nov. 5, 2013, 2 pages.
Patent Cooperation Treaty, "International Search Report," issued by the International Searching Authority in connection with PCT application No. PCT/US02/21698, mailed Dec. 20, 2002 (2 pages).
State Intellectual Property Office of P.R. China, "Decision of Rejection," issued in connection with Chinese Patent Application No. 201110026540.3 on Jan. 28, 2014 (7 pages).
State Intellectual Property Office of P.R. China, "English Translation of Third Office Action," issued in connection with Chinese Patent Application No. 201110026540.3, on Jul. 22, 2013, 6 pages.
State Intellectual Property Office of P.R. China, "First Office Action," issued on Apr. 20, 2012, in Chinese Patent Application No. 201110226540.3, 6 pages.
State Intellectual Property Office of P.R. China, "First Office Action," issued on May 3, 2012, in Chinese Patent Application No. 201110026566.8, 6 pages.
State Intellectual Property Office of P.R. China, "Second Office Action," issued on Feb. 7, 2013, in Chinese Patent Application No. 201110026540.3, 5 pages.
State Intellectual Property Office of P.R. China, "Second Office Action," issued on Dec. 16, 2011, in Chinese Patent Application No. 200710152176.9, 6 pages.
State Intellectual Property Office of P.R. China "The Notification of the First Office Action," issued on Aug. 24, 2010, in Chinese Application No. 200710152176.9, 9 pages.
UK Intellectual Property Office, "UK Search Report" dated Dec. 6, 2007, in connection with corresponding British Application No. GB0718038.3 (3 Pages).
United States Patent and Trademark Office, Final Office Action, issued in connection with U.S. Appl. No. 11/533,259, Dec. 30, 2009 (12 pages).
United States Patent and Trademark Office, "Final Office Action," issued in connection with U.S. Appl. No. 11/533,259, on Jun. 9, 2011 (18 pages).
United States Patent and Trademark Office, "Non-Final Office Action," issued in connection with U.S. Appl. No. 11/533,259, on Nov. 26, 2008 (14 pages).
United States Patent and Trademark Office, "Non-Final Office Action," issued in connection with U.S. Appl. No. 11/533,259, Feb. 2, 2011 (16 pages).
United States Patent and Trademark Office, "Non-Final Office Action," issued in connection with U.S. Appl. No. 11/533,259, on Jan. 31, 2012 (20 pages).
United States Patent and Trademark Office, "Non-Final Office Action," issued in connection with U.S. Appl. No. 13/709,974, on Mar. 27, 2013 (13 pages).
United States Patent and Trademark Office, "Notice of Allowance," issued in connection with U.S. Appl. No. 11/533,259, on Aug. 2, 2012 (13 pages).
United States Patent and Trademark Office, "Notice of Allowance," issued in connection with U.S. Appl. No. 13/709,974, on Sep. 25, 2013 (13 pages).
United States Patent and Trademark Office, "Restriction Requirement," issued in connection with U.S. Appl. No. 11/533,259, on Aug. 3, 2009 (6 pages).
United States Patent and Trademark Office, "Non-Final Office action," issued in connection with U.S. Appl. No. 14/170,072, on Jan. 5, 2015 (35 pages).
United States Patent and Trademark Office, "Notice of Allowance," issued in connection with U.S. Appl. No. 13/709,974, on Jan. 31, 2014 (52 pages).
United States Patent and Trademark Office, "Notice of Allowance," issued in connection with U.S. Appl. No. 13/709,974, on Feb. 25, 2014 (38 pages).
Emerson Process Management, "FieldQ Valve Actuator", Reference manual, Oct. 2006, 36 pages.
Pepperl+Fuchs, "Valve Coupler", Mar. 4, 2013, 5 pages.
Emerson Process Management, "S-Series Electronic Marshalling", Jan. 2014, 40 pages.
PR Electronics, "Profibus PA/Foundation Fielbus transmitter", Jan. 28, 2014, 2 pages.
United States Patent and Trademark Office, "Final office action", issued in connection with U.S. Appl. No. 14/170,072, mailed on Jun. 23, 2015, 33 pages.
United States Patent and Trademark Office, "Non-Final office action", issued in connection with U.S. Appl. No. 14/170,072, mailed on Mar. 17, 2016, 34 pages.

* cited by examiner

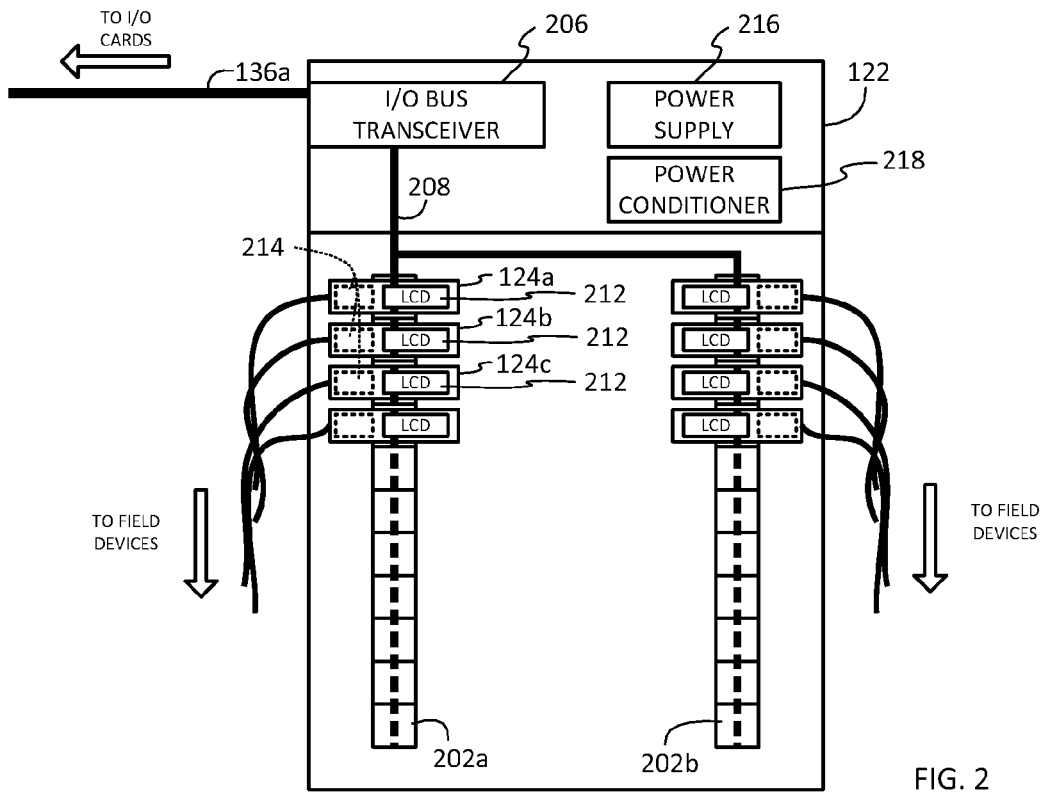
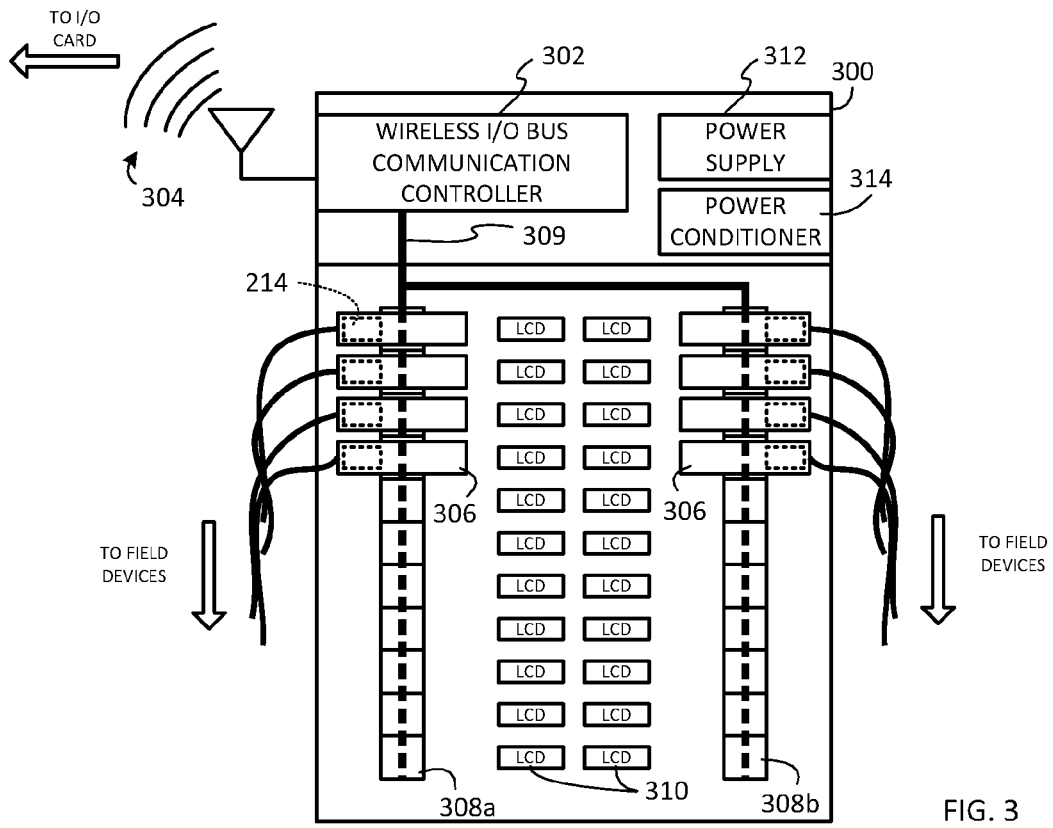
FIG. 2
FIG. 3

APPARATUS AND METHODS TO COMMUNICATIVELY COUPLE FIELD DEVICES TO CONTROLLERS IN A PROCESS CONTROL SYSTEM

RELATED APPLICATIONS

This is a continuation-in-part of U.S. patent application Ser. No. 14/170,072, filed on Jan. 31, 2014, which is a continuation of U.S. patent application Ser. No. 13/709,974, filed on Dec. 10, 2012, now U.S. Pat. No. 8,762,618, which is a continuation of U.S. patent application Ser. No. 11/533,259, filed on Sep. 19, 2006, now U.S. Pat. No. 8,332,567, which are hereby incorporated herein by reference in their entireties.

FIELD OF THE DISCLOSURE

The present disclosure relates generally to process control systems and, more particularly, to apparatus and methods to communicatively couple field devices to controllers in a process control system.

BACKGROUND

Process control systems, like those used in chemical, petroleum, pharmaceutical, pulp and paper, or other manufacturing processes, typically include one or more process controllers communicatively coupled to at least one host including at least one operator workstation and to one or more field devices configured to communicate via analog, digital or combined analog/digital communication protocols. The field devices, which may be, for example, device controllers, valves, valve actuators, valve positioners, switches and transmitters (e.g., temperature, pressure, flow rate, and chemical composition sensors) or combinations thereof, perform functions within the process control system such as opening or closing valves and measuring or inferring process parameters. A process controller receives signals indicative of process measurements made by the field devices and/or other information pertaining to the field devices, uses this information to implement a control routine, and generates control signals that are sent over the buses or other communication lines to the field devices to control the operation of the process control system.

A process control system can include a plurality of field devices that provide several different functional capabilities and that are often communicatively coupled to process controllers using two-wire interfaces in a point-to-point (e.g., one field device communicatively coupled to a field device bus) or a multi-drop (e.g., a plurality of field devices communicatively coupled to a field device bus) wiring connection arrangements or with wireless communications. Some field devices are configured to operate using relatively simple commands and/or communications (e.g., an ON command and an OFF command). Other field devices are more complex requiring more commands and/or more communication information, which may or may not include simple commands. For example, more complex field devices may communicate analog values with digital communications superimposed on the analog value using, for example, a Highway Addressable Remote Transducer ("HART") communication protocol. Other field devices can use entirely digital communications (e.g., a FOUNDATION Fieldbus communication protocol).

In a process control system, each field device is typically coupled to a process controller via one or more I/O cards and a respective communication medium (e.g., a two-wire cable, a wireless link, or an optical fiber). Thus, a plurality of communication media are required to communicatively couple a plurality of field devices to a process controller. Often the plurality of communication media coupled to the field devices are routed through one or more field junction boxes, at which point, the plurality of communication media are coupled to respective communication media (e.g., respective two-wire conductors) of a multi-conductor cable used to communicatively couple the field devices to the process controller via one or more I/O cards.

SUMMARY

Example apparatus and methods to communicatively couple field devices to controllers in a process control system are described. In accordance with an example, an example apparatus includes a base and a module to be removably attached to the base. The base includes a first physical interface to be communicatively coupled to one of a first field device in a process control system or a second field device in the process control system, and a second physical interface to be communicatively coupled to a controller in the process control system via a bus. The module communicates with the first field device using a first communication protocol when the first physical interface is communicatively coupled to the first field device. The module communicates with the second field device using a second communication protocol when the first physical interface is communicatively coupled to the second field device. The module communicates with the controller via the bus using a third communication protocol. The third communication protocol is different from the first and second communication protocols.

In accordance with another example, an example method involves receiving first information at a base having a first physical interface to be communicatively coupled to one of a first field device in a process control system or a second field device in the process control system. The example method also involves, at a module removably attached to the base, encoding the first information for communication using a first communication protocol. The first information communicated to the module from the first field device using a second communication protocol when the first physical interface is coupled to the first field device. The first information communicated to the module from the second field device using a third communication protocol when the first physical interface is coupled to the second field device. The first communication protocol is different from the first and second communication protocols. The method further involves communicating the encoded first information from the module, via a second physical interface of the base, to a controller via a bus using the first communication protocol.

In accordance with yet another example, an example apparatus includes a first interface to be communicatively coupled to one of a first field device in a process control system or a second field device in the process control system. The first interface communicates using a first fieldbus communication protocol when coupled to the first field device and to communicate using a second fieldbus communication protocol when coupled to the second field device. The example apparatus includes a communication processor communicatively coupled to the first interface. The communication processor encodes first information received from the one of the first field device or the second field device for communication via a bus using a third communication protocol different from the first and second fieldbus communication protocols. The example apparatus includes a second interface communicatively coupled to the communication processor and the bus to communicate the first information via the bus using the third communication protocol to a controller in the process control system. The bus is to use the third communication protocol to communicate second information received from the other one of the first field device or the second field device.

BRIEF DESCRIPTION OF THE DRAWINGS

FIG. 2 is a detailed diagram of the example marshalling cabinet of FIG. 1A.

FIG. 3 is another example marshalling cabinet that may be used to implement the example marshalling cabinet of FIG. 1A.

DETAILED DESCRIPTION

Although the following describes example apparatus and systems including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example apparatus and systems, persons of ordinary skill in the art will readily appreciate that the examples provided are not the only way to implement such apparatus and systems.

Figure 1A:
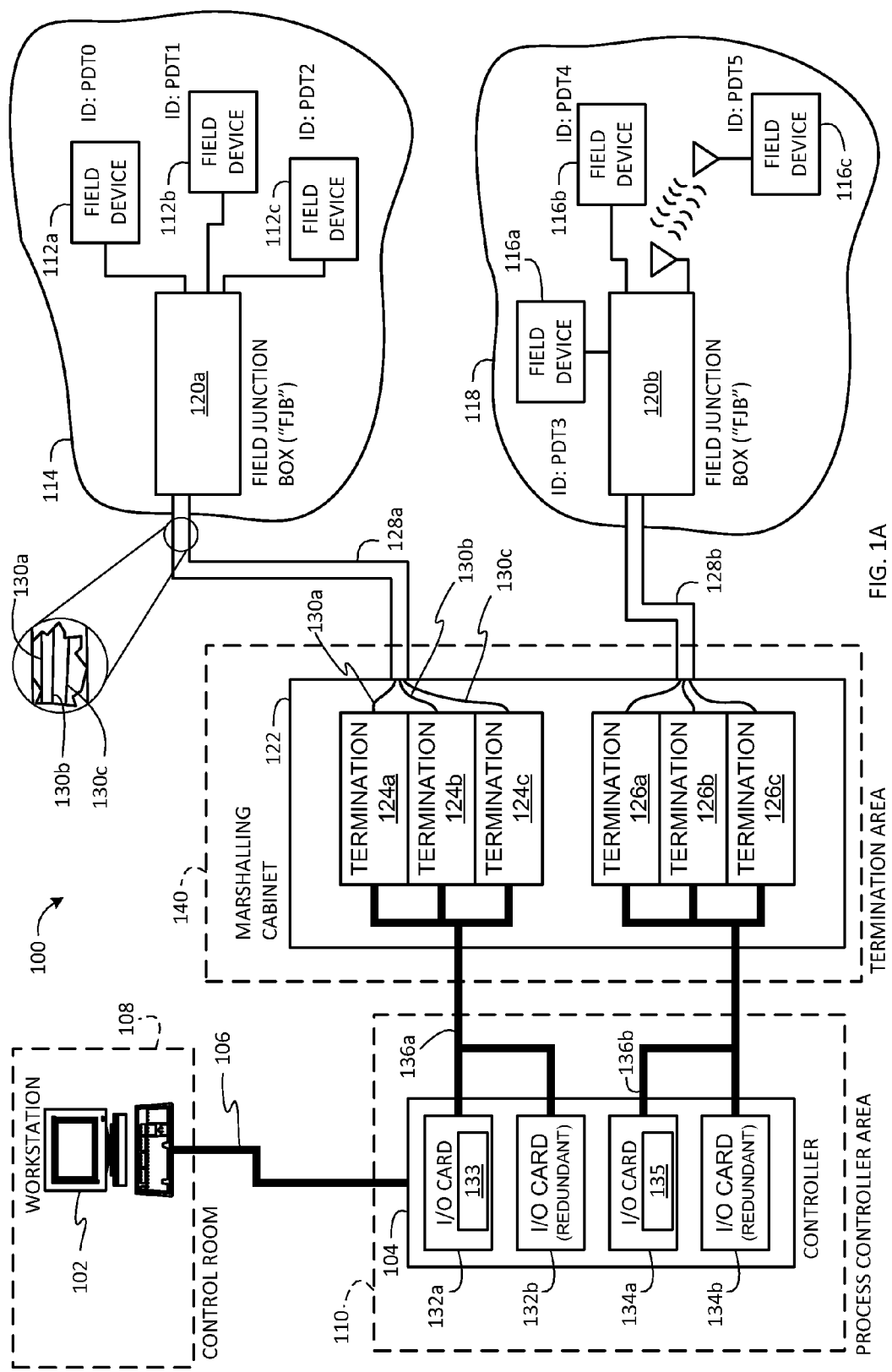
FIG. 1A is a block diagram illustrating an example process control system.

An example process control system includes a control room (e.g., a control room 108 of FIG. 1A), a process controller area (e.g. a process controller area 110 of FIG. 1A), a termination area (e.g., a termination area 140 of FIG. 1A), and one or more process areas (e.g., process areas 114 and 118 of FIG. 1A). A process area includes a plurality of field devices that perform operations (e.g., controlling valves, controlling motors, controlling boilers, monitoring, measuring parameters, etc.) associated with performing a particular process (e.g., a chemical process, a petroleum process, a pharmaceutical process, a pulp and paper process, etc.). Some process areas are not accessible by humans due to harsh environment conditions (e.g., relatively high temperatures, airborne toxins, unsafe radiation levels, etc.). The control room typically includes one or more workstations within an environment that is safely accessible by humans. The workstations include user applications that users (e.g., engineers, operators, etc.) can access to control operations of the process control system by, for example, changing variable values, process control functions, etc. The process control area includes one or more controllers communicatively coupled to the workstation(s) in the control room. The controllers automate control of the field devices in the process area by executing process control strategies implemented via the workstation. An example process strategy involves measuring a pressure using a pressure sensor field device and automatically sending a command to a valve positioner to open or close a flow valve based on the pressure measurement. The termination area includes a marshalling cabinet that enables the controllers to communicate with the field devices in the process area. In particular, the marshalling cabinet includes a plurality of termination modules used to marshal, organize, or route signals from the field devices to one or more I/O cards communicatively coupled to the controllers. The I/O cards translate information received from the field devices to a format compatible with the controllers and translate information from the controllers to a format compatible with the field devices.

Known techniques used to communicatively couple field devices within a process control system to controllers involve using a separate bus (e.g., a wire, a cable, or a circuit) between each field device and a respective I/O card communicatively coupled to a controller (e.g., a process controller, a programmable logic controller, etc.). An I/O card enables communicatively coupling a controller to a plurality of field devices associated with different data types or signal types (e.g., analog in (AI) data types, analog out (AO) data types, discrete in (DI) data types, discrete out (DO) data types, digital in data types, and digital out data types)) and different field device communication protocols by translating or converting information communicated between the controller and the field devices. For example, an I/O card may be provided with one or more field device interfaces configured to exchange information with a field device using the field device communication protocol associated with that field device. Different field device interfaces communicate via different channel types (e.g., analog in (AI) channel types, analog out (AO) channel types, discrete in (DI) channel types, discrete out (DO) channel types, digital in channel types, and digital out channel types)). In addition, the I/O card can convert information (e.g., voltage levels) received from the field device into information (e.g., pressure measurement values) that the controller can use to perform operations associated with controlling the field device. The known techniques require a bundle of wires or buses (e.g., a multi-core cable) to communicatively couple a plurality of field devices to I/O cards. Unlike known techniques that use a separate bus to communicatively couple each field device to I/O cards, the example apparatus and methods described herein may be used to communicatively couple field devices to an I/O card by terminating a plurality of field devices at a termination panel (e.g., a marshalling cabinet) and using one bus (e.g., a conductive communication medium, an optical communication medium, a wireless communication medium) communicatively coupled between the termination panel and the I/O card to communicatively couple the field devices to the I/O card.

The example apparatus and methods described herein involve using an example universal I/O bus (e.g., a common or shared communication bus) that communicatively couples one or more termination modules to one or more I/O cards communicatively coupled to a controller. Each termination module is communicatively coupled to one or more respective field devices using a respective field device bus (e.g., an analog bus or a digital bus). The termination modules are configured to receive field device information from the field devices via the field device buses and communicate the field device information to the I/O cards via the universal I/O bus by, for example, packetizing the field device information and communicating the packetized information to the I/O cards via the universal I/O bus. The field device information may include, for example, field device identification information (e.g., device tags, electronic serial numbers, etc.), field device status information (e.g., communication status, diagnostic health information (open loop, short, etc.)), field device activity information (e.g., process variable (PV) values), field device description information (e.g., field device type or function such as, for example, valve actuator, temperature sensor, pressure sensor, flow sensor, etc.), field device connection configuration information (e.g., multi-drop bus connection, point-to-point connection, etc.), field device bus or segment identification information (e.g., field device bus or field device segment via which field device is communicatively coupled to termination module), and/or field device data type information (e.g., a data type descriptor indicative of the data type used by a particular field device). The I/O card(s) can extract the field device information received via the universal I/O bus and communicate the field device information to the controller, which can then communicate some or all of the information to one or more workstation terminals for subsequent analysis.

To communicate field device information (e.g., commands, instructions, queries, threshold activity values (e.g., threshold PV values), etc.) from workstation terminals to field devices, I/O cards can packetize the field device information and communicate the packetized field device information to a plurality of termination modules. Each of the termination modules can then extract or depacketize respective field device information from the packetized communications received from a respective I/O card and communicate the field device information to a respective field device.

In the illustrated examples described herein, a termination panel (e.g., a marshalling cabinet) is configured to receive (e.g., connect to) a plurality of termination modules, each of which is communicatively coupled to a different field device. To indicate at the termination panel which termination modules are connected to which field devices, each termination module is provided with a termination labeler (or tagging system). A termination labeler includes an electronic display (e.g., a liquid crystal display (LCD)) and components to determine which field device or devices is/are connected to the termination module corresponding to the termination labeler. In some example implementations, displays are mounted on the termination panel instead of the termination modules. Each of the displays is mounted in association with a respective termination module socket. In this manner, when a termination module is removed from the termination panel, a corresponding display remains on the termination panel for use by a subsequently connected termination module.

Now turning to FIG. 1A, an example process control system 100 includes a workstation 102 communicatively coupled to a controller 104 via a bus or local area network (LAN) 106, which is commonly referred to as an application control network (ACN). The LAN 106 may be implemented using any desired communication medium and protocol. For example, the LAN 106 may be based on a hardwired or wireless Ethernet communication protocol. However, any other suitable wired or wireless communication medium and protocol could be used. The workstation 102 may be configured to perform operations associated with one or more information technology applications, user-interactive applications, and/or communication applications. For example, the workstation 102 may be configured to perform operations associated with process control-related applications and communication applications that enable the workstation 102 and the controller 104 to communicate with other devices or systems using any desired communication media (e.g., wireless, hardwired, etc.) and protocols (e.g., HTTP, SOAP, etc.). The controller 104 may be configured to perform one or more process control routines or functions that have been generated by a system engineer or other system operator using, for example, the workstation 102 or any other workstation and which have been downloaded to and instantiated in the controller 104. In the illustrated example, the workstation 102 is located in a control room 108 and the controller 104 is located in a process controller area 110 separate from the control room 108.

In the illustrated example, the example process control system 100 includes field devices 112*a-c* in a first process area 114 and field devices 116*a-c* in a second process control area 118. To communicate information between the controller 104 and the field devices 112*a-c* and 116*a-c*, the example process control system 100 is provided with field junction boxes (FJB's) 120*a-b* and a marshalling cabinet 122. Each of the field junction boxes 120*a-b* routes signals from respective ones of the field devices 112*a-c* and 116*a-c* to the marshalling cabinet 122. The marshalling cabinet 122, in turn, marshals (e.g., organizes, groups, etc.) information received from field devices 112*a-c* and 116*a-c* and routes the field device information to respective I/O cards (e.g., I/O cards 132*a-b* and 134*a-b*) of the controller 104. In the illustrated example, the communications between the controller 104 and the field devices 112*a-c* and 116*a-c* are bidirectional so that the marshalling cabinet 122 is also used to route information received from I/O cards of the controller 104 to respective ones of the field devices 112*a-c* and 116*a-c* via the field junction boxes 120*a-b*.

In the illustrated example, the field devices 112*a-c* are communicatively coupled to the field junction box 120*a* and the field devices 116*a-c* are communicatively coupled to the field junction box 120*b* via electrically conductive, wireless, and/or optical communication media. For example, the field junction boxes 120*a-b* may be provided with one or more electrical, wireless, and/or optical data transceivers to communicate with electrical, wireless, and/or optical transceivers of the field devices 112a-c and 116a-c. In the illustrated example, the field junction box 120b is communicatively coupled wirelessly to the field device 116c. In an alternative example implementation, the marshalling cabinet 122 may be omitted and signals from the field devices 112a-c and 116a-c can be routed from the field junction boxes 120a-b directly to the I/O cards of the controller 104. In yet another example implementation, the field junction boxes 120a-b may be omitted and the field devices 112a-c and 116a-c can be directly connected to the marshalling cabinet 122.

The field devices 112a-c and 116a-c may be Fieldbus compliant valves, actuators, sensors, etc., in which case the field devices 112a-c and 116a-c communicate via a digital data bus using the well-known FOUNDATION Fieldbus communication protocol (e.g., FF-H1). Of course, other types of field devices and communication protocols could be used instead. For example, the field devices 112a-c and 116a-c could instead be Profibus (e.g., Profibus PA), HART, or AS-i compliant devices that communicate via the data bus using the well-known Profibus and HART communication protocols. In some example implementations, the field devices 112a-c and 116a-c can communicate information using analog communications or discrete communications instead of digital communications. In addition, the communication protocols can be used to communicate information associated with different data types.

Each of the field devices 112a-c and 116a-c is configured to store field device identification information. The field device identification information may be a physical device tag (PDT) value, a device tag name, an electronic serial number, etc. that uniquely identifies each of the field devices 112a-c and 116a-c. In the illustrated example of FIG. 1A, the field devices 112a-c store field device identification information in the form of physical device tag values PDT0-PDT2 and the field devices 116a-c store field device identification information in the form of physical device tag values PDT3-PDT5. The field device identification information may be stored or programmed in the field devices 112a-c and 116a-c by a field device manufacturer and/or by an operator or engineer involved in installation of the field devices 112a-c and 116a-c.

To route information associated with the field devices 112a-c and 116a-c in the marshalling cabinet 122, the marshalling cabinet 122 is provided with a plurality of termination modules 124a-c and 126a-c. The termination modules 124a-c are configured to marshal information associated with the field devices 112a-c in the first process area 114 and the termination modules 126a-c are configured to marshal information associated with the field devices 116a-c in the second process area 118. As shown, the termination modules 124a-c and 126a-c are communicatively coupled to the field junction boxes 120a-b via respective multi-conductor cables 128a and 128b (e.g., a multi-bus cable). In an alternative example implementation in which the marshalling cabinet 122 is omitted, the termination modules 124a-c and 126a-c can be installed in respective ones of the field junction boxes 120a-b.

The illustrated example of FIG. 1A depicts a point-to-point configuration in which each conductor or conductor pair (e.g., bus, twisted pair communication medium, two-wire communication medium, etc.) in the multi-conductor cables 128a-b communicates information uniquely associated with a respective one of the field devices 112a-c and 116a-c. For example, the multi-conductor cable 128a includes a first conductor 130a, a second conductor 130b, and a third conductor 130c. Specifically, the first conductor 130a is used to form a first data bus configured to communicate information between the termination module 124a and the field device 112a, the second conductor 130b is used to form a second data bus configured to communicate information between the termination module 124b and the field device 112b, and the third conductor 130c is used to form a third data bus configured to communicate information between the termination module 124c and the field device 112c. In an alternative example implementation using a multi-drop wiring configuration, each of the termination modules 124a-c and 126a-c can be communicatively coupled with one or more field devices. For example, in a multi-drop configuration, the termination module 124a can be communicatively coupled to the field device 112a and to another field device (not shown) via the first conductor 130a. In some example implementations, a termination module can be configured to communicate wirelessly with a plurality of field devices using a wireless mesh network.

Additionally or alternatively, in some examples, a second field device (not shown) is communicatively coupled to the termination module 124a via the first conductor 130a as a redundant, spare, or replacement field device in addition to the field device 112a. In some such examples, the termination module 124a is configured to communicate exclusively with the field device 112a until there is a need to communicate with the spare device (e.g., when the field device 112a fails, when an operator configures the spare device to replace the field device 112a). That is, although there are two devices communicatively coupled to the termination module 124a via the first conductor 130a, unlike a multi-drop configuration, the communications between the termination module 124a and either the field device 112a or the spare field device operate effectively as a point-to-point connection. More specifically, while the termination module 124a may detect the spare field device, all communications will be directed to the primary or active device (e.g., the field device 112a) until the active device fails at which point communications will commence with the spare field device (either automatically or at the instigation of process control personnel). In some examples, the spare field device is commissioned and begins communicating with the termination module 124a while the failed field device 112a is still in the process control system (e.g., before being physically removed and/or deleted from the logical configuration of the system). In some such examples, the spare field device maintains a "spare" designation until plant personnel designate the spare field device as the new primary device. In other examples, the termination module 124a automatically swaps the spare field device for the field device 112a once the field device 112a fails. The ability to configure a spare field device to take over communications in this manner is typically unavailable for certain communication protocols (e.g., HART) because individual field devices are communicatively coupled directly into I/O cards in a point-to-point fashion. As a result, the replacement of a failed field device typically involves the physical removal of the field device, the installing of a new field device, and then the manual commissioning of the new field device. However, in some disclosed examples, as described more fully below, the field device 112a is connected to I/O cards indirectly through the termination module 124a over a high-speed universal I/O bus that has sufficient bandwidth to handle the presence of the separate spare field device on the first conductor 130a when implemented using a HART protocol for much faster replacement. A spare field device on the first conductor 130a may also be implemented for other communication protocols (e.g., Profibus PA, FF-H1, etc.) in addition to or instead of HART.

Each of the termination modules 124a-c and 126a-c may be configured to communicate with a respective one of the field devices 112a-c and 116a-c using a different data type. For example, the termination module 124a may include a digital field device interface to communicate with the field device 112a using digital data while the termination module 124b may include an analog field device interface to communicate with the field device 112b using analog data.

To control I/O communications between the controller 104 (and/or the workstation 102) and the field devices 112a-c and 116a-c, the controller 104 is provided with the plurality of I/O cards 132a-b and 134a-b. In the illustrated example, the I/O cards 132a-b are configured to control I/O communications between the controller 104 (and/or the workstation 102) and the field devices 112a-c in the first process area 114, and the I/O cards 134a-b are configured to control I/O communications between the controller 104 (and/or the workstation 102) and the field devices 116a-c in the second process area 118.

In the illustrated example of FIG. 1A, the I/O cards 132a-b and 134a-b reside in the controller 104. To communicate information from the field devices 112a-c and 116a-c to the workstation 102, the I/O cards 132a-b and 134a-b communicate the information to the controller 104 and the controller 104 communicates the information to the workstation 102. Similarly, to communicate information from the workstation 102 to the field devices 112a-c and 116a-c, the workstation 102 communicates the information to the controller 104, the controller 104 then communicates the information to the I/O cards 132a-b and 134a-b, and the I/O cards 132a-b and 134a-b communicate the information to the field devices 112a-c and 116a-c via the termination modules 124a-c and 126a-c. In an alternative example implementation, the I/O cards 132a-b and 134a-b can be communicatively coupled to the LAN 106 internal to the controller 104 so that the I/O cards 132a-b and 134a-b can communicate directly with the workstation 102 and/or the controller 104.

To provide fault tolerant operations in the event that either of the I/O cards 132a and 134a fails, the I/O cards 132b and 134b are configured as redundant I/O cards. That is, if the I/O card 132a fails, the redundant I/O card 132b assumes control and performs the same operations as the I/O card 132a would otherwise perform. Similarly, the redundant I/O card 134b assumes control when the I/O card 134a fails.

To enable communications between the termination modules 124a-c and the I/O cards 132a-b and between the termination modules 126a-c and the I/O cards 134a-b, the termination modules 124a-c are communicatively coupled to the I/O cards 132a-b via a first universal I/O bus 136a and the termination modules 126a-c are communicatively coupled to the I/O cards 134a-b via a second universal I/O bus 136b. Unlike the multi-conductor cables 128a and 128b, which use separate conductors or communication mediums for each one of the field devices 112a-c and 116a-c, each of the universal I/O buses 136a-b is configured to communicate information corresponding to a plurality of field devices (e.g., the field devices 112a-c and 116a-c) using the same communication medium. For example, the communication medium may be a serial bus, a two-wire communication medium (e.g., twisted-pair), an optical fiber, a parallel bus, etc. via which information associated with two or more field devices can be communicated using, for example, packet-based communication techniques, multiplexing communication techniques, etc.

In an example implementation, the universal I/O buses 136a-b are implemented using the RS-485 serial communication standard. The RS-485 serial communication standard can be configured to use less communication control overhead (e.g., less header information) than other known communication standards (e.g., Ethernet). However, in other example implementations, the universal I/O buses 136a-b can be implemented using any other suitable communication standard including Ethernet, universal serial bus (USB), IEEE 1394, etc. In addition, although the universal I/O buses 136a-b are described above as wired communication mediums, in another example implementation, one or both of the universal I/O buses 136a-b can be implemented using a wireless communication medium (e.g., wireless Ethernet, IEEE-802.11, Wi-Fi®, Bluetooth®, etc.).

The universal I/O buses 136a and 136b are used to communicate information in substantially the same manner. In the illustrated example, the I/O bus 136a is configured to communicate information between the I/O cards 132a-b and the termination modules 124a-c. The I/O cards 132a-b and the termination modules 124a-c use an addressing scheme to enable the I/O cards 132a-b to identify which information corresponds to which one of the termination modules 124a-c and to enable each of the termination modules 124a-c to determine which information corresponds to which of the field devices 112a-c. When a termination module (e.g., one of the termination modules 124a-c and 126a-c) is connected to one of the I/O cards 132a-b and 134a-b, that I/O card automatically obtains an address of the termination module (from, for example, the termination module) to exchange information with the termination module. In this manner, the termination modules 124a-c and 126a-c can be communicatively coupled anywhere on the respective buses 136a-b without having to manual supply termination module addresses to the I/O cards 132a-b and 134a-b and without having to individually wire each of the termination modules 124a-c and 126a-c to the I/O cards 132a-b and 134a-b.

By using the universal I/O buses 136a-b, the number of communication media (e.g., wires) required to communicate information between the marshalling cabinet 122 and the controller 104 is substantially reduced relative to known configurations that require a separate communication medium for each termination module to communicate with a controller. Reducing the number of communication media (e.g., reducing the number of communication buses or communication wires) required to communicatively couple the marshalling cabinet 122 to the controller 104 reduces engineering costs required to design and generate drawings for installation of the connections between the controller 104 and the field devices 112a-c and 116a-c. In addition, reducing the number of communication media, in turn, reduces installation costs and maintenance costs. For example, one of the I/O buses 136a-b replaces a plurality of communication media used in known systems to communicatively couple field devices to a controller. Therefore, instead of maintaining a plurality of communication media for communicatively coupling the field devices 112a-c and 116a-c to the I/O cards 132a-b and 134a-b, the illustrated example of FIG. 1A requires substantially less maintenance by using the I/O buses 136a-b. Furthermore, in the context of fieldbus based field devices (e.g., Profibus PA compliant devices or FOUNDATION fieldbus H1 (FF-H1) compliant devices), using the universal I/O buses 136a-b also reduces or eliminates the costs associated with the acquisition, installation, and maintenance of other components used to implement an associated fieldbus architecture. For example, in addition to the cable for the trunk or segment in a fieldbus architecture, each of Profibus PA and FF-H1 typically requires protocol specific I/O cards, a power conditioner (for FF-H1) or DP/PA coupler (for Profibus PA), and segment protectors. However, with fieldbus devices coupled to the termination modules 124a-c and 126a-c to communicate with the controller via the universal I/O buses 136a-b, such components are no longer needed. Furthermore, in some examples, where each fieldbus device is connected to a corresponding termination module 124a-c or 126a-c in a point-to-point architecture, the costs and complexity of fieldbus segment design work may be significantly reduced or eliminated because the marshalling of device signals is handled electronically after being received by each corresponding termination module.

In addition, reducing the number of communication media required to communicatively couple the marshalling cabinet 122 to the I/O cards 132a-b and 134a-b results in more available space for more termination modules (e.g., the termination modules 124a-c and 126a-c), thereby increasing the I/O density of the marshalling cabinet 122 relative to known systems. In the illustrated example of FIG. 1A, the marshalling cabinet 122 can hold a number of termination modules that would otherwise require more marshalling cabinets (e.g., three marshalling cabinets) in a known system implementation. Furthermore, in some examples, the marshalling cabinet 122 can hold a greater number of termination modules 124a-c corresponding to a greater number of field devices 112a-c communicating data over a single universal I/O bus 136a than the number of field devices communicating data over other types of bus communications. For example, a fieldbus segment is typically limited to carrying signals for up to 16 field devices. In contrast, in some examples, one of the universal I/O buses 136a-b may provide communications associated with up to 96 termination modules 124a-c and 126a-c.

By providing the termination modules 124a-c and the termination modules 126a-c that can be configured to use different data type interfaces (e.g., different channel types) to communicate with the field devices 112a-c and 116a-c and that are configured to use respective common I/O buses 136a and 136b to communicate with the I/O cards 132a-b and 134a-b, the illustrated example of FIG. 1A enables routing data associated with different field device data types (e.g., the data types or channel types used by the field devices 112a-c and 116a-c) to the I/O cards 132a-b and 134a-b without having to implement a plurality of different field device interface types on the I/O cards 132a-b and 134a-b. Therefore, an I/O card having one interface type (e.g., an I/O bus interface type for communicating via the I/O bus 136a and/or the I/O bus 136b) can communicate with a plurality of field devices having different field device interface types.

Using the I/O bus 136a and/or the I/O bus 136b to exchange information between the controller 104 and the termination modules 124a-c and 126a-c enables defining field device-to-I/O card connection routing late in a design or installation process. For example, the termination modules 124a-c and 126a-c can be placed in various locations within the marshalling cabinet 122 while maintaining access to a respective one of the I/O buses 136a and 136b.

In the illustrated example, the marshalling cabinet 122, the termination modules 124a-c and 126a-c, the I/O cards 132a-b and 134a-b, and the controller 104 facilitate migrating existing process control system installations to a configuration substantially similar to the configuration of the example process control system 100 of FIG. 1A. For example, because the termination modules 124a-c and 126a-c can be configured to include any suitable field device interface type, the termination modules 124a-c and 126a-c can be configured to be communicatively coupled to existing field devices already installed in a process control system. Similarly, the controller 104 can be configured to include a known LAN interface to communicate via a LAN to an already installed workstation. In some example implementations, the I/O cards 132a-b and 134a-b can be installed in or communicatively coupled to known controllers so that controllers already installed in a process control system need not be replaced.

In the illustrated example, the I/O card 132a includes a data structure 133 and the I/O card 134a includes a data structure 135. The data structure 133 stores the field device identification numbers (e.g., field device identification information) corresponding to field devices (e.g., the field devices 112a-c) that are assigned to communicate with the I/O card 132a via the universal I/O bus 136a. The termination modules 124a-c can use the field device identification numbers stored in the data structure 133 to determine whether a field device is incorrectly connected to one of the termination modules 124a-c. The data structure 135 stores the field device identification numbers (e.g., field device identification information) corresponding to field devices (e.g., the field devices 116a-c) that are assigned to communicate with the I/O card 134a via the universal I/O bus 136b. The data structures 133 and 135 can be populated by engineers, operators, and/or users via the workstation 102 during a configuration time or during operation of the example process control system 100. In some examples, the termination modules 124a-c may be communicatively coupled to multiple field devices (e.g., an active field device and a redundant or spare field device). In such examples, the data structure 135 stores the field device identification numbers corresponding to each field device (e.g., the field devices 116a-c and the corresponding spare field devices). Although not shown, the redundant I/O card 132b stores a data structure identical to the data structure 133 and the redundant I/O card 134b stores a data structure identical to the data structure 135. Additionally or alternatively, the data structures 133 and 135 can be stored in the workstation 102.

In the illustrated example, the marshalling cabinet 122 is shown located in a termination area 140 separate from the process control area 110. By using the I/O buses 136a-b instead of substantially more communication media (e.g., a plurality of communication buses, each uniquely associated with one of the field devices 112a-c and 116a-c or a limited group of them along a multi-drop segment) to communicatively couple the termination modules 124a-c and 126a-c to the controller 104 facilitates locating the controller 104 relatively farther from the marshalling cabinet 122 than in known configurations without substantially decreasing the reliability of communications. In some example implementations, the process control area 110 and the termination area 140 can be combined so that the marshalling cabinet 122 and the controller 104 are located in the same area. In any case, placing the marshalling cabinet 122 and the controller 104 in areas separate from the process areas 114 and 118 enables isolating the I/O cards 132a-b and 134a-b, the termination modules 124a-c and 126a-c and the universal I/O buses 136a-b from harsh environmental conditions (e.g., heat, humidity, electromagnetic noise, etc.) that may be associated with the process areas 114 and 118. In this manner, the cost and complexity of designing and manufacturing the termination modules 124a-c and 126a-c and the I/O cards 132a-b and 134a-b can be substantially reduced relative to the cost of manufacturing communications and control circuitry for the field devices 112a-c and 116a-c because the termination modules 124a-c and 126a-c and the I/O cards 132a-b and 134a-b do not require operating specification features (e.g., shielding, more robust circuitry, more complex error checking, etc.) required to guarantee reliable operation (e.g., reliable data communications) as would otherwise be necessary to operate in the environmental conditions of the process areas 114 and 118.

Figure 1B:
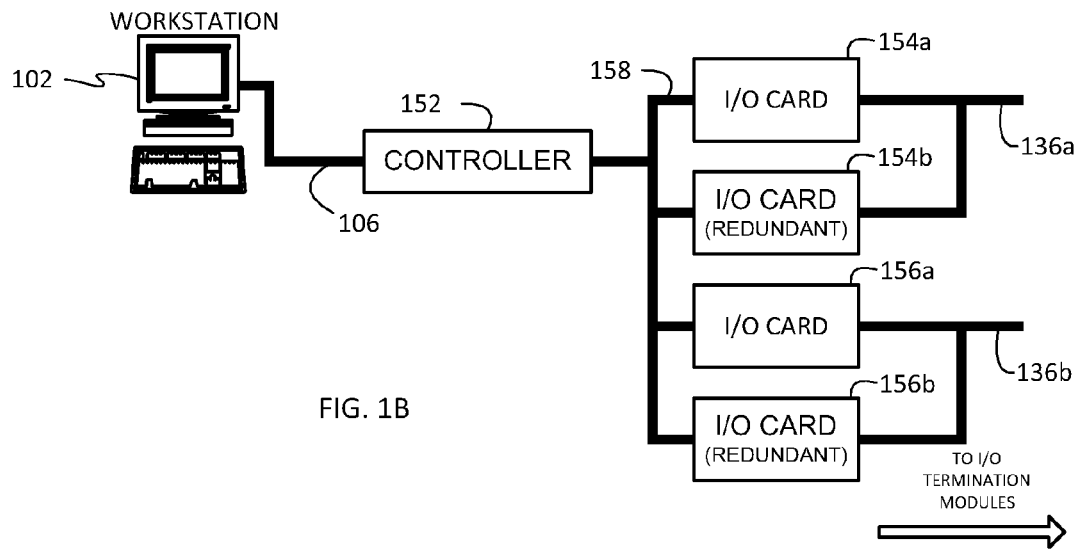
FIGS. 1B-1D depict alternative example implementations that may be used to communicatively couple workstations, controllers, and I/O cards.
Figure 1C:
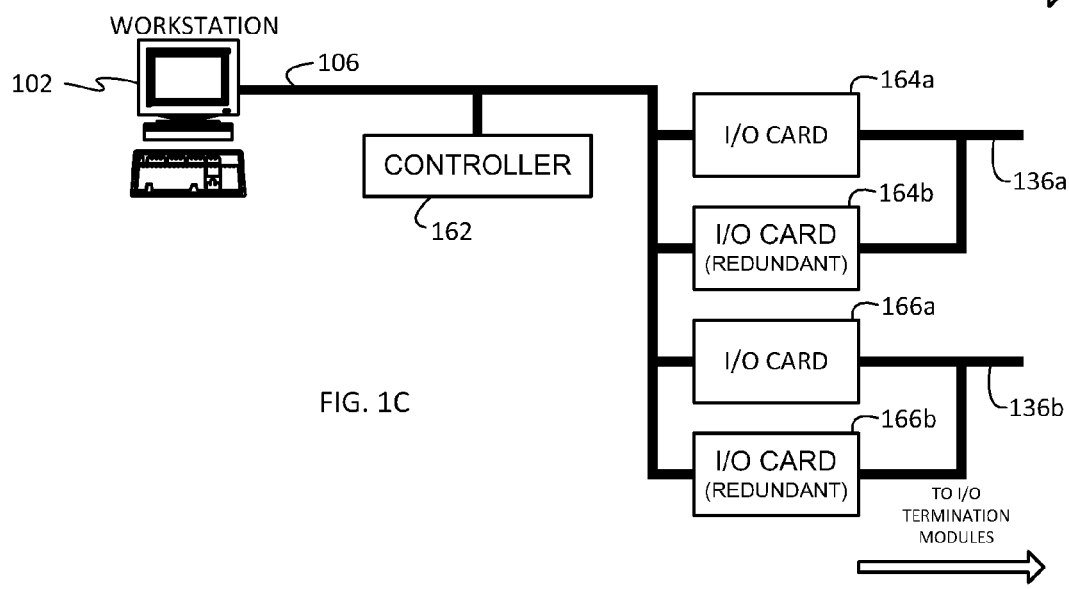
Figure 1D:
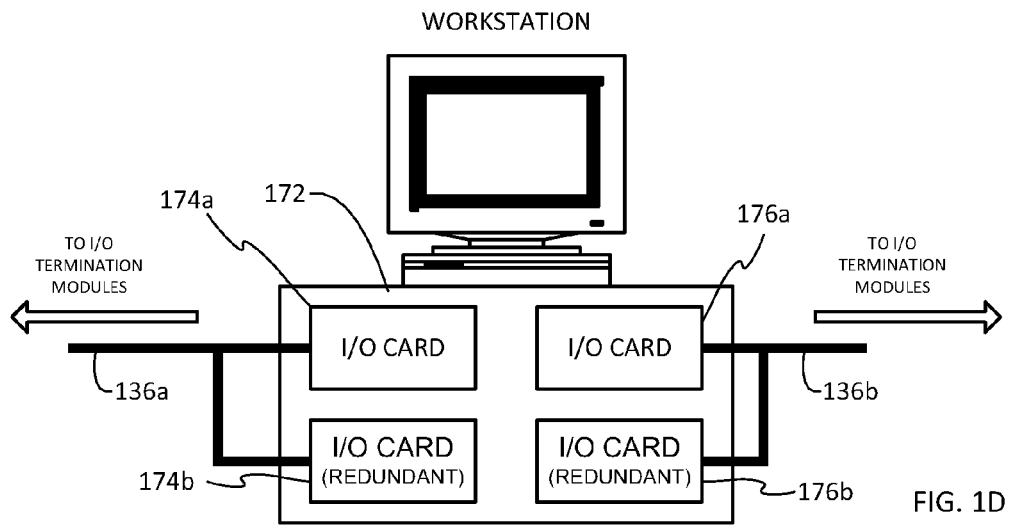

FIGS. 1B-1D depict alternative example implementations that may be used to communicatively couple workstations, controllers, and I/O cards. For example, in the illustrated example depicted in FIG. 1B a controller 152 (which performs substantially the same functions as the controller 104 of FIG. 1A) is communicatively coupled to I/O cards 154*a-b* and 156*a-b* via a backplane communication bus 158. The I/O cards 154*a-b* and 156*a-b* perform substantially the same functionality as the I/O cards 132*a-b* and 134*a-b* of FIG. 1A and are configured to be communicatively coupled to the universal I/O buses 136*a-b* to exchange information with the termination modules 124*a-c* and 126*a-c*. To communicate with the workstation 102, the controller 152 is communicatively coupled to the workstation 102 via the LAN 106.

In another illustrated example depicted in FIG. 1C a controller 162 (which performs substantially the same functions as the controller 104 of FIG. 1A) is communicatively coupled to the workstation 102 and a plurality of I/O cards 164*a-b* and 166*a-b* via the LAN 106. The I/O cards 164*a-b* and 166*a-b* perform substantially the same functionality as the I/O cards 132*a-b* and 134*a-b* of FIG. 1A and are configured to be communicatively coupled to the universal I/O buses 136*a-b* to exchange information with the termination modules 124*a-c* and 126*a-c*. However, unlike the I/O cards 132*a-b* and 134*a-b* of FIG. 1A and the I/O cards 154*a-b* and 156*a-b* of FIG. 1B, the I/O cards 164*a-b* and 166*a-b* are configured to communicate with the controller 162 and the workstation 102 via the LAN 106. In this manner, the I/O cards 164*a-b* and 166*a-b* can exchange information directly with the workstation 102.

In yet another illustrated example depicted in FIG. 1D, I/O cards 174*a-b* and 176*a-b* (which perform substantially the same functions as the I/O cards 132*a-b* and 134*a-b* of FIG. 1A) are implemented in a workstation 172 (which performs substantially the same functions as the workstation 102 of FIG. 1A). In some example implementations, the physical I/O cards 174*a-b* and 176*a-b* are not included in the workstation 172, but the functionality of the I/O cards 174*a-b* and 176*a-b* are implemented in the workstation 172. In the illustrated example of FIG. 1D, the I/O cards 174*a-b* and 176*a-b* are configured to be communicatively coupled to the universal I/O buses 136*a-b* to exchange information with the termination modules 124*a-c* and 126*a-c*. Also, in the illustrated example of FIG. 1D, the workstation 172 may be configured to perform substantially the same functions as the controller 104 so that a controller need not be provided to perform a process control strategy. However, a controller may be provided.

FIG. 2 is a detailed diagram of the example marshalling cabinet 122 of FIG. 1A. In the illustrated example, the marshalling cabinet 122 is provided with socket rails 202*a* and 202*b* to receive the termination modules 124*a-c*. In addition, the marshalling cabinet 122 is provided with an I/O bus transceiver 206 that communicatively couples the termination modules 124*a-c* to the universal I/O bus 136*a* described above in connection with FIG. 1A. The I/O bus transceiver 206 may be implemented using a transmitter amplifier and a receiver amplifier that conditions signals exchanged between the termination modules 124*a-c* and the I/O cards 132*a-b*. The marshalling cabinet 122 is provided with another universal I/O bus 208 communicatively coupling the terminal modules 124*a-c* to the I/O bus transceiver 206. In the illustrated example, the I/O bus transceiver 206 is configured to communicate information using a wired communication medium. Although not shown, the marshalling cabinet 122 may be provided with another I/O bus transceiver substantially similar or identical to the I/O bus transceiver 206 to communicatively couple the termination modules 126*a-c* with the I/O cards 134*a-b*.

Using a common communication interface (e.g., the I/O bus 208 and the I/O bus 136*a*) to exchange information between the I/O cards 132*a-b* and the termination modules 124*a-c* enables defining field device-to-I/O card connection routing late in a design or installation process. For example, the termination modules 124*a-c* can be communicatively coupled to the I/O bus 208 at various locations (e.g., various termination module sockets of the socket rails 202*a-b*) within the marshalling cabinet 122. In addition, the common communication interface (e.g., the I/O bus 208 and the I/O bus 136*a*) between the I/O cards 132*a-b* and the termination modules 124*a-c* reduces the number of communication media (e.g., the number of communication buses and/or wires) between the I/O cards 132*a-b* and the termination modules 124*a-c*, thus enabling installation of relatively more of the termination modules 124*a-c* (and/or the termination modules 126*a-c*) in the marshalling cabinet 122 than the number of known termination modules that can be installed in known marshalling cabinet configurations.

To display field device identification information and/or other field device information in association with the termination modules 124*a-c*, each of the termination modules 124*a-c* is provided with a display 212 (e.g., an electronic termination label). The display 212 of the termination module 124*a* displays the field device identification (e.g., a field device tag) of the field device 112*a* (FIG. 1A). In addition, the display 212 of the termination module 124*a* can be used to display field device activity information (e.g., measurement information, line voltages, etc.), data type information (e.g., analog signal, digital signal, etc.), field device status information (e.g., device on, device off, device error, etc.), and/or any other field device information. If the termination module 124*a* is configured to be communicatively coupled to a plurality of field devices (e.g., the field device 112*a* of FIG. 1A and other field devices (not shown)), the display 212 can be used to display field device information associated with all of the field devices communicatively coupled to the termination module 124. In the illustrated example, the displays 212 are implemented using liquid crystal displays (LCD's). However, in other example implementations, the displays 212 can be implemented using any other suitable display technology.

To retrieve the field device identification information and/or other field device information, each of the termination modules 124*a-c* is provided with a labeler 214 (e.g., a termination labeler). For example, when the field device 112*a* is communicatively coupled to the termination module 124*a*, the labeler 214 of the termination module 124*a* retrieves the field device identification information and/or any other field device information from the field device 112*a* (and/or other field devices communicatively coupled to the termination module 124*a*) and displays the information via the display 212 of the termination module 124*a*. The labelers 214 are described in detail below in connection with FIG. 8. Providing the display 212 and the labeler 214 decreases the costs and installation time associated with manually attaching labels to wires and/or buses associated with termination modules and field devices. However, in some example implementations, manual wire labeling may also be used in connection with the display 212 and labeler 214. For example, the field devices 112*a-c* and 116*a-c* may be communicatively coupled to the I/O cards 132*a-b* and 134*a-b* relatively quickly by using the display 212 and the labeler 214 to determine which of the field devices 112*a-c* and 116*a-c* is connected to each of the termination modules 124*a-c* and 126*a-c*. Subsequently, after installation is complete, labels may optionally be added to the buses or wires extending between the termination modules 124*a-c* and 126*a-c* and the field devices 112*a-c* and 114*a-c*.

The display 212 and the labeler 214 can also decrease costs and time associated with maintenance operations by configuring the display 212 and the labeler 214 to display status information (e.g., device error, device alarm, device on, device off, device disabled, etc.) to facilitate a trouble shooting processes.

To provide electrical power to the termination modules 124a-c, the I/O bus transceiver 206, and the displays 212, the marshalling cabinet 122 is provided with a power supply 216. In the illustrated example, the termination modules 124a-c use the electrical power from the power supply 216 to power communication channels or communication interfaces used to communicate with field devices (e.g., the field devices 112a-c of FIG. 1A) and/or to provide the field devices electrical power for operation. Additionally, in some examples, the marshalling cabinet 122 is provided with a power conditioner 218 to condition or regulate the power provided to each termination module 124a-c along the socket rails 202a-b. In some examples, the termination modules 124a-c may be powered from an external power supply and/or power conditioner via an integrated power injection bus communicatively coupled to the socket rails 202a-b.

FIG. 3 is another example marshalling cabinet 300 that may be used to implement the example marshalling cabinet 122 of FIG. 1A. In the illustrated example, the marshalling cabinet 300 is provided with a wireless I/O bus communication controller 302 to communicate with the controller 104 of FIG. 1A wirelessly via a wireless universal I/O connection 304. As shown in FIG. 3, a plurality of termination modules 306 substantially similar or identical to the termination modules 124a-c and 126a-c of FIG. 1A are plugged into rail sockets 308a and 308b and communicatively coupled to the wireless I/O bus communication controller 302 via a universal I/O bus 309 internal to the marshalling cabinet 300. In the illustrated example, the wireless I/O bus communication controller 302 emulates an I/O card (e.g., the I/O card 134a of FIG. 1A) of the controller 104 of FIG. 1A to enable the termination modules 306 to communicate with the controller 104.

Unlike the illustrated example of FIG. 2 in which the displays 212 are mounted on the termination modules 124a-c, in the illustrated example of FIG. 3, a plurality of displays 310 are mounted in the marshalling cabinet 300 in association with sockets to receive termination modules. In this manner, when one of the termination modules 306 is plugged in and communicatively coupled to a field device (e.g., one of the field devices 112a-c and 116a-c of FIG. 1A), a labeler 214 of the termination module 306 and a respective one of the displays 310 can be used to display the field device identification information indicative of the field device connected to the termination module 306. The displays 310 can also be used to display any other field device information. The marshalling cabinet 300 is provided with a power supply 312 that is substantially similar or identical to the power supply 216 of FIG. 2. Further, in some examples, the marshalling cabinet 300 is provided with a power conditioner 314 that is substantially similar or identical to the power conditioner 218 of FIG. 2.

Figure 4:
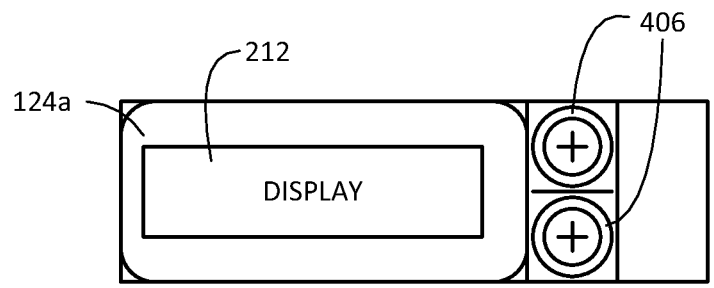
FIG. 4 depicts a top view and FIG. 5 depicts a side view of an example termination module of FIGS. 1A and 2.
Figure 5:
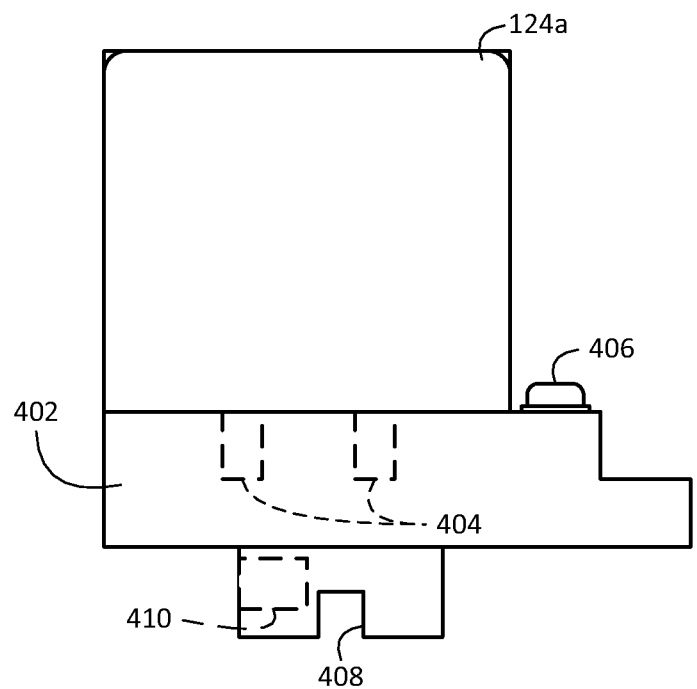

FIG. 4 depicts a top view and FIG. 5 depicts a side view of the example termination module 124a of FIGS. 1A and 2. In the illustrated example of FIG. 4, the display 212 is on a top surface of the example termination module 124a so that the display 212 is visible to an operator or user during operation when the termination module 124a is plugged into the rail socket 202a (FIG. 3). As shown in the illustrated example of FIG. 5, the example termination module 124a is removably coupled to a base 402. The example termination module 124a includes a plurality of contacts 404 (two of which are shown) that communicatively couple and/or electrically couple the termination module 124a to the base 402. In this manner, the base 402 can be coupled to the marshalling cabinet 122 (FIGS. 1A and 2), and the termination module 124a can be coupled to and removed from the marshalling cabinet 122 via the base 402. The base 402 is provided with termination screws 406 (e.g., a field device interface) to tie down or secure conductive communication media (e.g., a bus) from the field device 112a. When the termination module 124a is removably coupled to the base 402, the termination screws 406 are communicatively coupled to one or more of the contacts 404 to enable communicating information between the termination module 124a and the field device 112a. In other example implementations, the base 402 may be provided with any other suitable type of field device interface (e.g., a socket) instead of the termination screws 406. In addition, although one field device interface (e.g., the termination screws 406) is shown, the base 402 may be provided with more field device interfaces configured to enable communicatively coupling a plurality of field devices to the termination module 124a.

To communicatively couple the termination module 124a to the universal I/O bus 208 of FIG. 2, the base 402 is provided with a universal I/O bus connector 408 (FIG. 5). When a user plugs the base 402 into the socket rail 202a or the socket rail 202b (FIG. 2), the universal I/O bus connector 408 engages the universal I/O bus 208. The universal I/O bus connector 408 may be implemented using any suitable interface including a relatively simple interface such as, for example, an insulation piercing connector. To enable communicating information between the termination module 124a and the I/O bus 208, the I/O bus connector 408 is connected to one or more of the contacts 404 of the termination module 124a.

As shown in FIG. 5, the base 402 may also be provided with an optional display interface connector 410 to communicatively couple the termination module 124a to an external display (e.g., one of the displays 310 of FIG. 3). For example, if the termination module 124a is implemented without the display 212, the termination module 124a can use the display interface connector 410 to output field device identification information or any other field device information to an external display (e.g., one of the displays 310 of FIG. 3).

Figure 6:
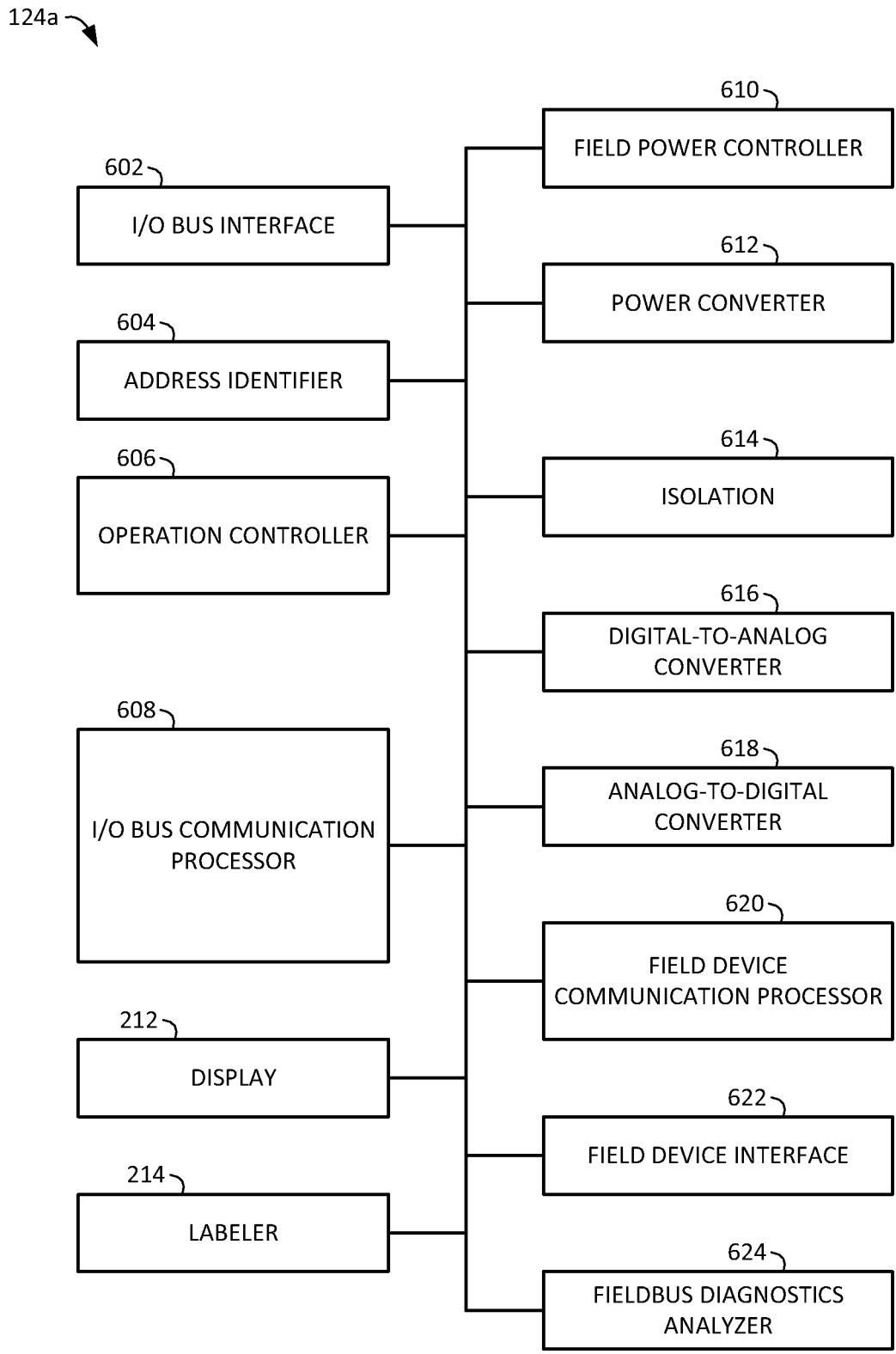
FIG. 6 is a detailed block diagram of the example termination module of FIGS. 1A, 2, 4, 5, 13A-B, and 14A-B.
Figure 7:
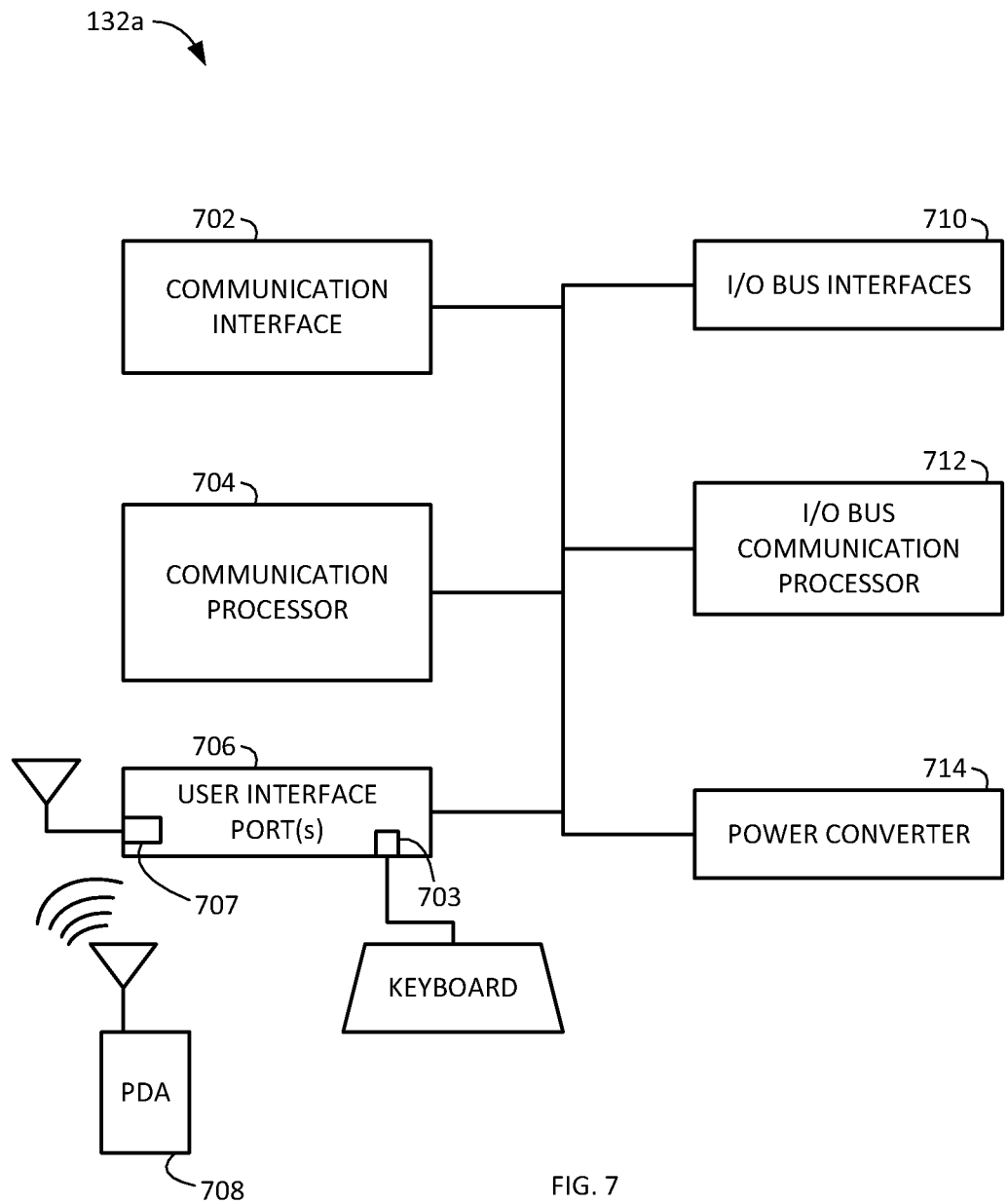
FIG. 7 is a detailed block diagram of an example I/O card of FIG. 1A.
Figure 8:
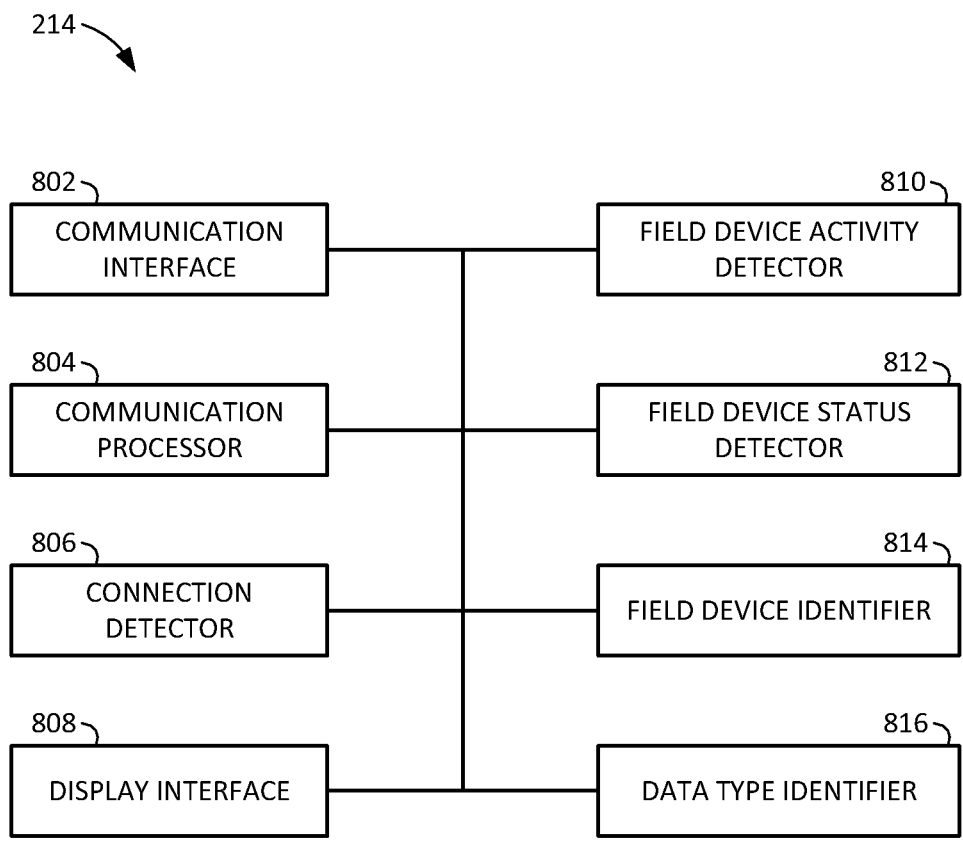
FIG. 8 is a detailed block diagram of an example labeler that may be used to display field device identification information and/or any other field device information in association with the termination modules of FIGS. 1A, 2-6, 13A-B, and 14A-B.

FIG. 6 is a detailed block diagram of the example termination module 124a of FIGS. 1A and 2, FIG. 7 is a detailed block diagram of the example I/O card 132a of FIG. 1A, and FIG. 8 is a detailed block diagram of the example labeler 214 of FIGS. 2, 3, and 6. The example termination module 124a, the example I/O card 132a and the example labeler 214 may be implemented using any desired combination of hardware, firmware, and/or software. For example, one or more integrated circuits, discrete semiconductor components, or passive electronic components may be used. Additionally or alternatively, some or all of the blocks of the example termination module 124a, the example I/O card 132a and the example labeler 214, or parts thereof, may be implemented using instructions, code, and/or other software and/or firmware, etc. stored on a machine accessible medium that, when executed by, for example, a processor system (e.g., the example processor system 1610 of FIG. 16), perform the operations represented in the flowcharts of FIGS. 10A, 10B, 11A, 11B, and 12. Although the example termination module 124a, the example I/O card 132a and the example labeler 214 are described as having one of each block described below, each of the example termination module 124a, the example I/O card 132a and the example labeler 214 may be provided with two or more of any respective block described below.

Turning to FIG. 6, the example termination module 124a includes a universal I/O bus interface 602 to enable the example termination module 124a to communicate with the I/O cards 132a-b of FIG. 1A (or with any other I/O cards). The I/O bus interface 602 may be implemented using, for example, the RS-485 serial communication standard, Ethernet, etc. To identify an address of the termination module 124a and/or an address of the I/O card 132a, the termination module 124a is provided with an address identifier 604. The address identifier 604 may be configured to query the I/O card 132a (FIG. 1A) for a termination module address (e.g., a network address) when the termination module 124a is plugged into the marshalling cabinet 122. In this manner, the termination module 124a can use the termination module address as a source address when communicating information to the I/O card 132a and the I/O card 132a uses the termination module address as a destination address when communicating information to the termination module 124a.

To control the various operations of the termination module 124a, the termination module 124a is provided with an operation controller 606. In an example implementation, the operation controller can be implemented using a microprocessor or a microcontroller. The operation controller 606 communicates instructions or commands to other portions of the example termination module 124a to control the operations of those portions.

The example termination module 124a is provided with an I/O bus communication processor 608 to exchange information with the I/O card 132a via the universal I/O bus 136a. In the illustrated example, the I/O bus communication processor 608 packetizes information for transmission to the I/O card 132a and depacketizes information received from the I/O card 132a. In the illustrated example, the I/O bus communication processor 608 generates header information for each packet to be transmitted and reads header information from received packets. Example header information includes a destination address (e.g., the network address of the I/O card 132a), a source address (e.g., the network address of the termination module 124a), a packet type or data type (e.g., analog field device information, field device information, command information, temperature information, real-time data values, etc.), and error checking information (e.g., cyclical-redundancy-check (CRC)). In some example implementations, the I/O bus communication processor 608 and the operation controller 606 may be implemented using the same microprocessor or microcontroller.

To provide (e.g., obtain and/or generate) field device identification information and/or any other field device information (e.g., activity information, data type information, status information, etc.), the termination module 124a is provided with the labeler 214 (FIGS. 2 and 3). The labeler 214 is described in detail below in connection with FIG. 8. The termination module 124a also includes the display 212 (FIG. 2) to display the field device identification information and/or any other field device information provided by the labeler 214.

To control the amount of power provided to the field device 112a of FIG. 1A (or any other field device), the termination module 124a is provided with a field power controller 610. In the illustrated example, the power supply 216 in the marshalling cabinet 122 (FIG. 2) provides electrical power to the termination module 124a to power a communication channel interface to communicate with the field device 112a. For example, some field devices communicate using 12 volts and others communicate using 24 volts. In the illustrated example, the field power controller 610 is configured to condition, regulate, and step up and/or step down the electrical power provided to the termination module 124a by the power supply 216. In some examples, power conditioning is accomplished via the power conditioner 218 associated with the marshalling cabinet (FIG. 2). In some example implementations, the field power controller 610 is configured to limit the amount of electrical power used to communicate with the field devices and/or delivered to the field devices to substantially reduce or eliminate the risk of sparking in flammable or combustible environments.

To convert electrical power received from the power supply 216 (FIG. 2) to electrical power for the termination module 124a and/or the field device 112a, the termination module 124a is provided with a power converter 612. In the illustrated example, the circuitry used to implement the termination module 124a uses one or more voltage levels (e.g., 3.3 V) that are different from the voltage levels required by the field device 112a. The power converter 612 is configured to provide the different voltage levels for the termination module 124a and the field device 112a using the power received from the power supply 216. In the illustrated example, the electrical power outputs generated by the power converter 612 are used to power up the termination module 124a and the field device 112a and to communicate information between the termination module 124a and the field device 112a. Some field device communication protocols require relatively higher or lower voltage levels and/or electrical current levels than other communication protocols. In the illustrated example, the field power controller 610 controls the power converter 612 to provide the voltage level(s) to power up the field device 112a and to communicate with the field device 112a. However, in other example implementations, the electrical power outputs generated by the power converter 612 may be used to power up the termination module 124a while a separate power supply external to the marshalling cabinet 122 is used to power up the field device 112a.

To electrically isolate the circuitry of the termination module 124a from the I/O card 132a, the termination module 124a is provided with one or more isolation devices 614. The isolation devices 614 may be implemented using galvanic isolators and/or optical isolators. An example isolation configuration is described in detail below in connection with FIG. 9.

To convert between analog and digital signals, the termination module 124a is provided with a digital-to-analog converter 616 and an analog-to-digital converter 618. The digital-to-analog converter 616 is configured to convert digitally represented analog values received from the I/O card 132a to analog values that can be communicated to the field device 112a of FIG. 1A. The analog-to-digital converter 618 is configured to convert analog values (e.g., measurement values) received from the field device 112a to digitally represented values that can be communicated to the I/O card 132a. In an alternative example implementation in which the termination module 124a is configured to communicate digitally with the field device 112a, the digital-to-analog converter 616 and the analog-to-digital converter 618 can be omitted from the termination module 124a.

To control communications with the field device 112a, the termination module 124a is provided with a field device communication processor 620. The field device communication processor 620 ensures that information received from the I/O card 132a is in the correct format and voltage type (e.g., analog or digital) to be communicated to the field device 112a. The field device communication processor 620 is also configured to packetize or depacketize information if the field device 112a is configured to communicate using digital information. In addition, the field device communication processor 620 is configured to extract information received from the field device 112a and communicate the information to the analog-to-digital converter 618 and/or to the I/O bus communication processor 608 for subsequent communication to the I/O card 132a. In some examples, the field device communication processor 620 assists in identifying the appropriate communication protocol associated with the field device 112a. For example, the termination module 124a may be configured to communicate with fieldbus compliant devices including Profibus PA devices or FF-H1 devices. In such examples, the field device communication processor 620 implements an autosensing routine in which the field device communication processor 620 formats a test signal or request corresponding to the Profibus PA communication protocol. If the field device 112a responds to the request, the field device 112a is confirmed as a Profibus PA compliant device and all future communications are formatted based on the Profibus PA protocol. If the field device 112a does not respond to the Profibus PA formatted request, the field device communication processor 620 formats a second request corresponding to the FF-H1 communication protocol to confirm whether the fieldbus device 112a is an FF-H1 compliant device based on whether the field device 112a responds to the second request. If the termination module 124a is configured for communications using other protocols (e.g., HART), the field device communication processor 620 may generate additional requests until the appropriate communication protocol for the field device 112a is detected.

In some examples, such autosensing routines are implemented on a periodic (or aperiodic) basis (e.g., after a certain threshold period of time) to detect any changes in the field device(s) communicatively coupled to the termination module 124a. For example, an autosensing routine may detect a first active or primary field device (e.g., the field device 112a) and a second, spare field device (not shown) on the conductor 130a communicatively coupled to the termination module 124a. If the first field device fails, the termination module 124a may detect this by a loss of communication with the first field device. In some such examples, the autosensing routine detects the spare device and compares the device information (e.g., placeholder information, device type, vendor, revision, etc.) to the device information of the fails device. In some examples, if the device information matches (e.g., the primary field device and the spare device are the same device except for the serial number) the termination module 124a automatically swaps the spare field device for the first field device to continue control of the process system. Additionally or alternatively, in some examples, if the device information contains some differences (e.g., different version or vendor), the termination module 124a automatically commissions and begins communicating with the spare field device but maintains the "spare" designation (while continuing to represent the first field device as the primary device though disconnected) until an operator or engineer designates removes the first field device and/or designates the spare field device as the new active or primary device.

In the illustrated example, the field device communication processor 620 is also configured to timestamp information received from the field device 112a. Generating timestamps at the termination module 124a facilitates implementing sequence of events (SOE) operations using timestamp accuracies in the sub-millisecond range. For example, the timestamps and respective information can be communicated to the controller 104 and/or the workstation 102. Sequence of events operations performed by, for example, the workstation 102 (FIG. 1A) (or any other processor system) can then be used to analyze what happened before, during, and/or after a particular state of operation (e.g., a failure mode) to determine what caused the particular state of operation to occur. Timestamping in the sub-millisecond range enables capturing events using relatively higher granularity. In some example implementations, the field device communication processor and the operation controller 606 can be implemented using the same microprocessor or microcontroller.

In general, field device communication controllers similar to the field device communication controller 620 are provided with communication protocol functions or other communication functions (e.g., Fieldbus communication protocol functions, HART communication protocol functions, etc.) corresponding to the type of field device with which they are configured to communicate. For example, if the field device 112a is implemented as a HART device, the field device communication controller 620 of the termination module 124a is provided with HART communication protocol functions. When the termination module 124a receives information from the I/O card 132a intended for the field device 112a, the field device communication controller 620 formats the information in accordance with the HART communication protocol and delivers the information to the field device 112a.

In the illustrated example, the field device communication controller 620 is configured to process pass-through messages. Pass-through messages originate at a workstation (e.g., the workstation 102 of FIG. 1A) and are communicated as payload (e.g., the data portion of a communication packet) through a controller (e.g., the controller 104 of FIG. 1A) and to a termination module (e.g., the termination module 124a of FIG. 1A) for delivery to a field device (e.g., the field device 112a). For example, a message originating at the workstation 102 and intended to be delivered to the field device 112a is tagged at the workstation 102 with a communication protocol descriptor (e.g., a HART protocol descriptor) and/or is formatted in accordance with a communication protocol of the field device 112a. The workstation 102 then wraps the message into a payload(s) of one or more communication packets to deliver the message from the workstation 102, through the I/O controller 104, and to the termination module 124a as a pass-through message. Wrapping the message involves, for example, packetizing the message within header information in accordance with a communication protocol (e.g., a Fieldbus protocol, a HART protocol, etc.) used to communicate with the field devices. When the termination module 124a receives the communication packet(s) containing the pass-through message from the I/O card 132, the I/O bus communication processor 608 (FIG. 6) extracts the payload(s) from the received communication packet(s). The field device communication controller 620 (FIG. 6) then unwraps the pass-through message from the payload(s), formats the message in accordance with the communication protocol descriptor generated by the workstation 102 (if not already formatted at the workstation 102), and communicates the message to the field device 112a.

The field device communication controller 620 is also configured to communicate pass-through messages to the workstation 102 in a similar manner. For example, if the field device 112a generates a message (e.g., a response to the workstation message or any other message) intended to be delivered to the workstation 102, the field device communication controller 620 wraps the message from the field device 112a into the payload of one or more communication packets and the I/O bus communication processor 608 communicates the one or more packets containing the wrapped message to the I/O card 132a. When the workstation 102 receives the packets from the controller 104 containing the wrapped message, the workstation 102 can unwrap and process the message.

The termination module 124a is provided with a field device interface 622 configured to communicatively couple the termination module 124a to a field device (e.g., the field device 112a of FIG. 1A). For example, the field device interface 622 may be communicatively coupled to the termination screws 406 of FIGS. 4 and 5 via one or more of the contacts 404 (FIG. 4).

In some examples, the termination module 124a is provided with a fieldbus diagnostics analyzer 624 configured to provide advanced diagnostics regarding the associated field device when the field device is fieldbus compliant. The fieldbus diagnostics analyzer 624 performs measurements regarding the condition of the physical wiring (e.g., the first conductor 130a of FIG. 1A) and the associated communications during operation. For example, the fieldbus diagnostics analyzer 624 may measure the supply voltage, load current, signal level, line noise and/or jitter. While advanced diagnostic modules with similar functionality may be incorporated into traditional fieldbus architectures, the diagnostics provided by the fieldbus diagnostics analyzer 624 may be more reliable and/or robust because the termination module 124a is only coupled to a single field device in a point-to-point architecture rather than having to diagnose multiple devices in a multi-drop architecture of a traditional fieldbus segment.

Turning now to FIG. 7, the example I/O card 132a of FIG. 1A includes a communication interface 702 to communicatively couple the I/O card 132a to the controller 104 (FIG. 1A). In addition, the example I/O card 132a includes a communication processor 704 to control communications with the controller 104 and to pack and unpack information exchanged with the controller 104. In the illustrated example, the communication interface 702 and the communication processor 704 are configured to communicate to the controller 104 information intended to be delivered to the controller 104 and information to be delivered to the workstation 102 (FIG. 1A). To communicate information intended to be delivered to the workstation 102, the communication interface 702 may be configured to wrap the information (e.g., information from the field devices 112a-c, the termination modules 124a-c, and/or the I/O card 132a) in the payload of one or more communication packet(s) in accordance with a communication protocol (e.g., a transmission control protocol (TCP), a user datagram protocol (UDP), etc.) and to communicate the packets containing the information to the workstation 102. The workstation 102 can then unpack the payload(s) from the received packet(s) and unwrap the information in the payload(s). In the illustrated example, the information in the payload of packets communicated by the communication interface 702 to the workstation 102 may contain one or more wrappers. For example, information originating at a field device (e.g., the field device 112a) may be wrapped in a field device communication protocol wrapper (e.g., a FOUNDATION Fieldbus communication protocol wrapper, a HART communication protocol wrapper, etc.), which the communication interface 702 wraps in accordance with a TCP-based protocol, a UDP-based protocol, or any other protocol to enable the controller 104 to subsequently communicate the information to the workstation 102. In a similar manner, the communication interface 702 may be configured to unwrap information communicated by the workstation 102 to the controller 104 and intended for delivery to the field devices 112a-c, the termination modules 124a-c, and/or the I/O card 132a.

In an alternative example implementation, the communication interface 702 and the communication processor 704 can communicate information (with or without a field device communication protocol wrapper) to the controller 104 and the controller 104 can packetize information intended to be delivered to the workstation 102 in the same manner as described above. The communication interface 702 and the communication processor 704 may be implemented using any wired or wireless communication standard.

In an alternative example implementation such as, for example, the illustrated example of FIG. 1C, the communication interface 702 and the communication processor 704 may be configured to communicate with the workstation 102 and/or the controller 162 via the LAN 106.

To enable users to interact with and/or access the I/O card 132a, the I/O card 132a is provided with one or more user interface ports 706. In the illustrated example, the user interface ports 706 include a keyboard interface port 703 and a portable handheld computer (e.g., a personal digital assistant (PDA), a tablet PC, etc.) interface port 707. For example, a PDA 708 is shown communicatively coupled to the user interface port 706 using wireless communications.

To communicatively couple the I/O card 132a to the universal I/O bus 136a (FIG. 1A), the I/O card 132a is provided with an I/O bus interface 710. To process communication information exchanged via the I/O bus 136a and to control communications made via the I/O bus 136a, the I/O card 132a is provided with an I/O bus communication processor 712. The I/O bus interface 710 may be similar or identical to the I/O bus interface 602 of FIG. 6 and the I/O bus communication processor 712 may be similar or identical to the I/O bus communication processor 608 of FIG. 6. To convert electrical power provided by the controller 104 of FIG. 1A to electrical power needed to power and operate the I/O card 132a and/or to communicate with the termination modules 124a-c, the I/O card 132a is provided with a power converter 714.

Turning now to FIG. 8, the example labeler 214 includes a communication interface 802 configured to communicatively couple the labeler 214 to a termination module (e.g., the termination module 124a of FIGS. 1A, 2, 4, 5, and 6) and/or a field device (e.g., the field device 112a of FIG. 1A) to retrieve field device identification information (e.g., a device tag value, a device name, an electronic serial number, etc.) and/or other field device information (e.g., activity information, data type information, status information, etc.). To control communications with the termination module 124a and/or the field device 112a, the labeler 214 is provided with a communication processor 804.

To detect a connection to a field device (e.g., the field device 112a of FIG. 1A), the labeler 214 is provided with a connection detector 806. The connection detector 806 may be implemented using, for example, a voltage sensor, a current sensor, a logic circuit, etc. that senses when the field device 112a has been connected to the termination module 124a. In the illustrated example, when the connection detector 806 determines that the field device 112a has been connected to the termination module 124a, the connection detector 806 causes a notification (e.g., an interrupt) to be communicated to the communication processor 804 indicating the detected connection. The communication processor 804 then queries the termination module 124a and/or the field device 112a for the field device identification information of the field device 112a. In an example implementation, the connection detector 806 can also be configured to determine the type of connection that communicatively couples the field device 112a to the termination module 124a such as, for example, a multi-drop connection, a point-to-point connection, a point-to-point connection with an active field device with an inactive spare field device, a wireless mesh network connection, an optical connection, etc.

To display the field device identification information and/or other field device information, the labeler 214 is provided with a display interface 808. In the illustrated example, the display interface 808 is configured to drive and control a liquid crystal display (LCD). For example, the display interface 808 may be configured to control the LCD display 212 (FIG. 2) mounted on the termination module 124a or the LCD display 310 mounted on the marshalling cabinet 300 (FIG. 3). However, in other example implementations, the display interface 808 may instead be configured to drive other display types.

To detect the activity of the field device 112a, the labeler 214 is provided with a field device activity detector 810. In the illustrated example, when the communication processor 804 receives data from the termination module 124a and/or the field device 112a, the communication processor 804 communicates the received data to the field device activity detector 810. The field device activity detector 810 then extracts process variable (PV) values from the data including, for example, measurement information (e.g., temperature, pressure, line voltages, etc.) or other monitoring information (e.g., valve closed, valve open, etc.) generated by the field device 112a. The display interface 808 can then display the field device activity information (e.g., the PV values, measurement information, monitoring information, etc.).

To detect the status of the field device 112a, the labeler 214 is provided with a field device status detector 812. The field device status detector 812 is configured to extract status information (e.g., device on, device off, device error, device alarm, device health (open loop, short, etc.), device communication status, etc.) associated with the field device 112a from data received by the communication processor 804 from the termination module 124a and/or the field device 112a. In some examples, the status information includes information based on data obtained via the fieldbus diagnostics analyzer 624 (FIG. 6). The display interface 808 can then display the received status information.

To identify the field device 112a, the labeler 214 is provided with a field device identifier 814. The field device identifier 814 is configured to extract the field device identification information (e.g., a device tag value, a device name, an electronic serial number, etc.) from data received by the communication processor from the termination module 124a and/or the field device 112a. The display interface 808 can then display the field device identification information. In an example implementation, the field device identifier 814 may also be configured to detect the field device type (e.g., valve actuator, pressure sensor, temperature sensor, flow sensor, etc.). In some examples, the field device identifier 814 is configured to identify the appropriate communication protocol associated with the field device 112a in the same or similar manner as, or in combination with, the field device communication processor 620 as described above in connection with FIG. 6.

To identify a data type (e.g., analog or digital) associated with the field device 112a, the labeler 214 is provided with a data type identifier 816. The data type identifier 816 is configured to extract the data type identification information from data received by the communication processor from the termination module 124a and/or the field device 112a. For example, the termination module 124a may store a data type descriptor variable that indicates the type of field device (e.g., analog, digital, etc.) with which it is configured to communicate, and the termination module 124a may communicate the data type descriptor variable to the communication processor 804 of the labeler 214. The display interface 808 can then display the data type. In some examples, the data type identifier 816 uses the communication protocol identified by the field device identifier 814 to determine the data type associated with the field device 112a.

Figure 9:
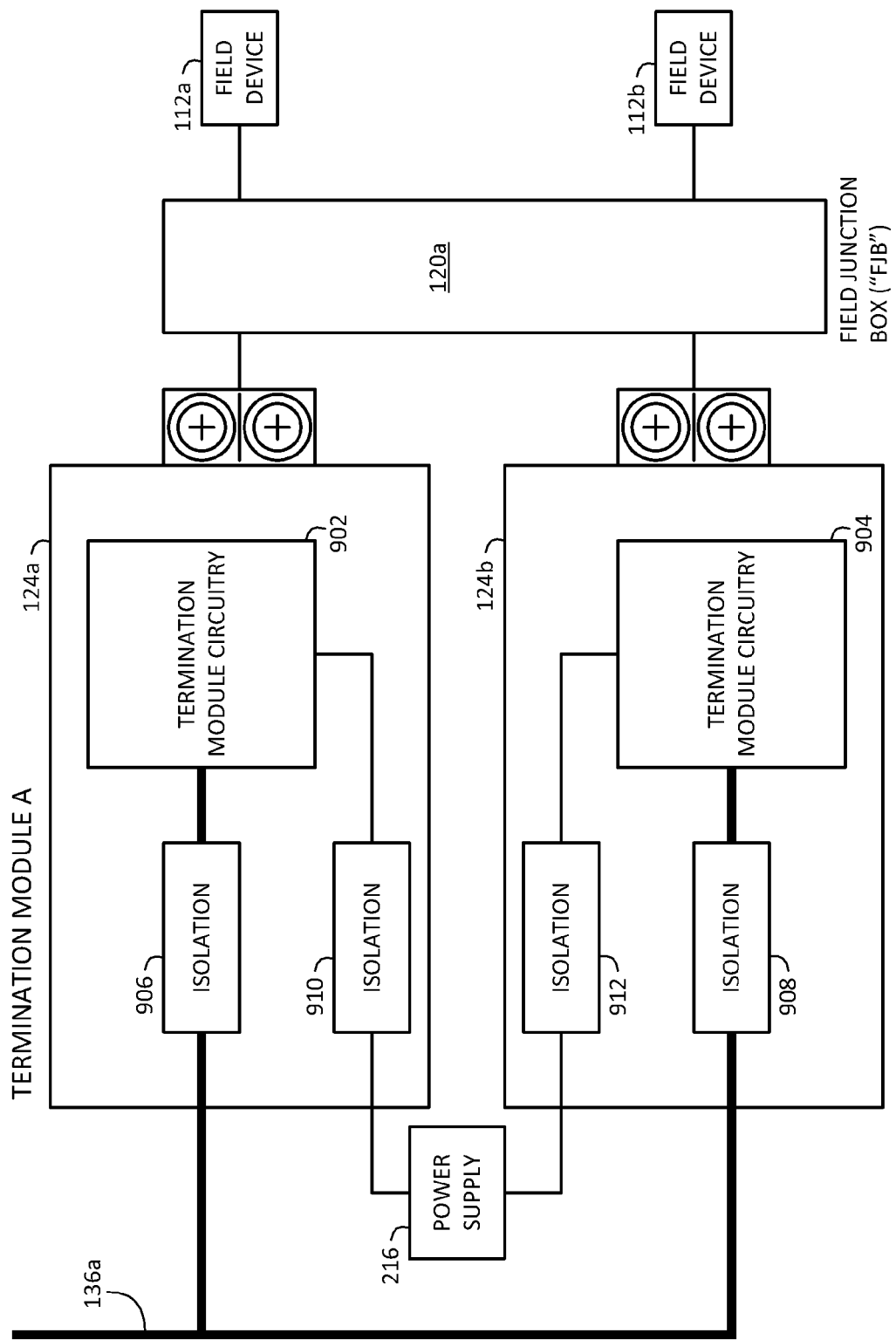
FIG. 9 depicts an isolation circuit configuration that may be implemented in connection with the example termination modules of FIG. 1A to electrically isolate the termination modules from one another, from field devices, and from communication buses.

FIG. 9 depicts an isolation circuit configuration that may be implemented in connection with the example termination modules 124a and 124b of FIG. 1A to electrically isolate the termination modules 124a-b from one another and the field devices 112a-b from the universal I/O bus 136a. In the illustrated example, each of the termination modules 124a-b includes respective termination module circuitry 902 and 904 (e.g., one or more of the blocks described above in connection with FIG. 6). In addition, the termination modules 124a-b are connected to their respective field devices 112a-b via the field junction box 120a. Also, the termination modules 124a-b are connected to the universal I/O bus 136a and the power supply 216. To electrically isolate the termination module circuitry 902 from the universal I/O bus 136a, the termination module 124a is provided with an isolation circuit 906. In this manner, the termination module circuitry 902 can be configured to follow (e.g., float) the voltage level of the field device 112a if power surges or other power variations occur in the field device 112a without affecting the voltage of the universal I/O bus 136a and without causing damage to the I/O card 132a (FIG. 1A). The termination module 124b also includes an isolation circuit 908 configured to isolate the termination module circuitry 904 from the universal I/O bus 136a. The isolation circuits 906 and 908 and any other isolation circuits implemented in the termination modules 124a-b may be implemented using optical isolation circuits or galvanic isolation circuits.

To isolate the termination module circuitry 902 from the power supply 216, the termination module 124a is provided with an isolation circuit 910. Similarly, the termination module 124b is provided with an isolation circuit 912 to isolate the termination module circuitry 904 from the power supply 216. By isolating the termination module circuitry 902 and 904 from the power supply 216, any power variation (e.g., power surges, current spikes, etc.) associated with the field devices 112a-b will not harm the power supply 216. Also, any power variations in one of the termination modules 124a-b will not harm or affect the operation of the other one of the termination modules 124a-b.

In known process control systems, isolation circuits are provided in known marshalling cabinets, thereby reducing the amount of space available for known termination modules. However, providing the isolation circuits 906, 910, 908, and 912 in the termination modules 124a and 124b as shown in the illustrated example of FIG. 9 reduces the amount of space required in the marshalling cabinet 122 (FIGS. 1A and 2) for isolation circuits, thus increasing the amount of space available for termination modules (e.g., the termination modules 124a-c and 126a-c). In addition, implementing isolation circuits (e.g., the isolation circuits 906, 908, 910, and 912) in termination modules (e.g., the termination modules 124a-b) enables selectively using isolation circuits only with termination modules that require isolation. For example, some of the termination modules 124a-c and 126a-c of FIG. 1A may be implemented without isolation circuits.

FIGS. 10A, 10B, 11A, 11B, 12 and 15 are flowcharts of example methods that may be used to implement termination modules (e.g., the termination module 124a of FIGS. 1A, 2, and 4-6 and/or the termination module 1332a of FIG. 13B), I/O cards (e.g., the I/O card 132a of FIGS. 1A and 7), and labelers (e.g., the labeler 214 of FIGS. 2, 3, and 8). In some example implementations, the example methods of FIGS. 10A, 10B, 11A, 11B, 12 and 15 may be implemented using machine readable instructions comprising a program for execution by a processor (e.g., the processor 1612 shown in the example processor system 1610 of FIG. 16). The program may be embodied in software stored on a tangible medium such as a CD-ROM, a floppy disk, a hard drive, a digital versatile disk (DVD), or a memory associated with the processor 1612 and/or embodied in firmware and/or dedicated hardware in a well-known manner. Further, although the example program is described with reference to the flowcharts illustrated in FIGS. 10A, 10B, 11A, 11B, 12, and 15, persons of ordinary skill in the art will readily appreciate that many other methods of implementing the example termination module 124a, the example termination module 1332a, the example I/O card 132a, and the example labeler 214 described herein may alternatively be used. For example, the order of execution of the blocks may be changed, and/or some of the blocks described may be changed, eliminated, or combined.

Figure 10A:
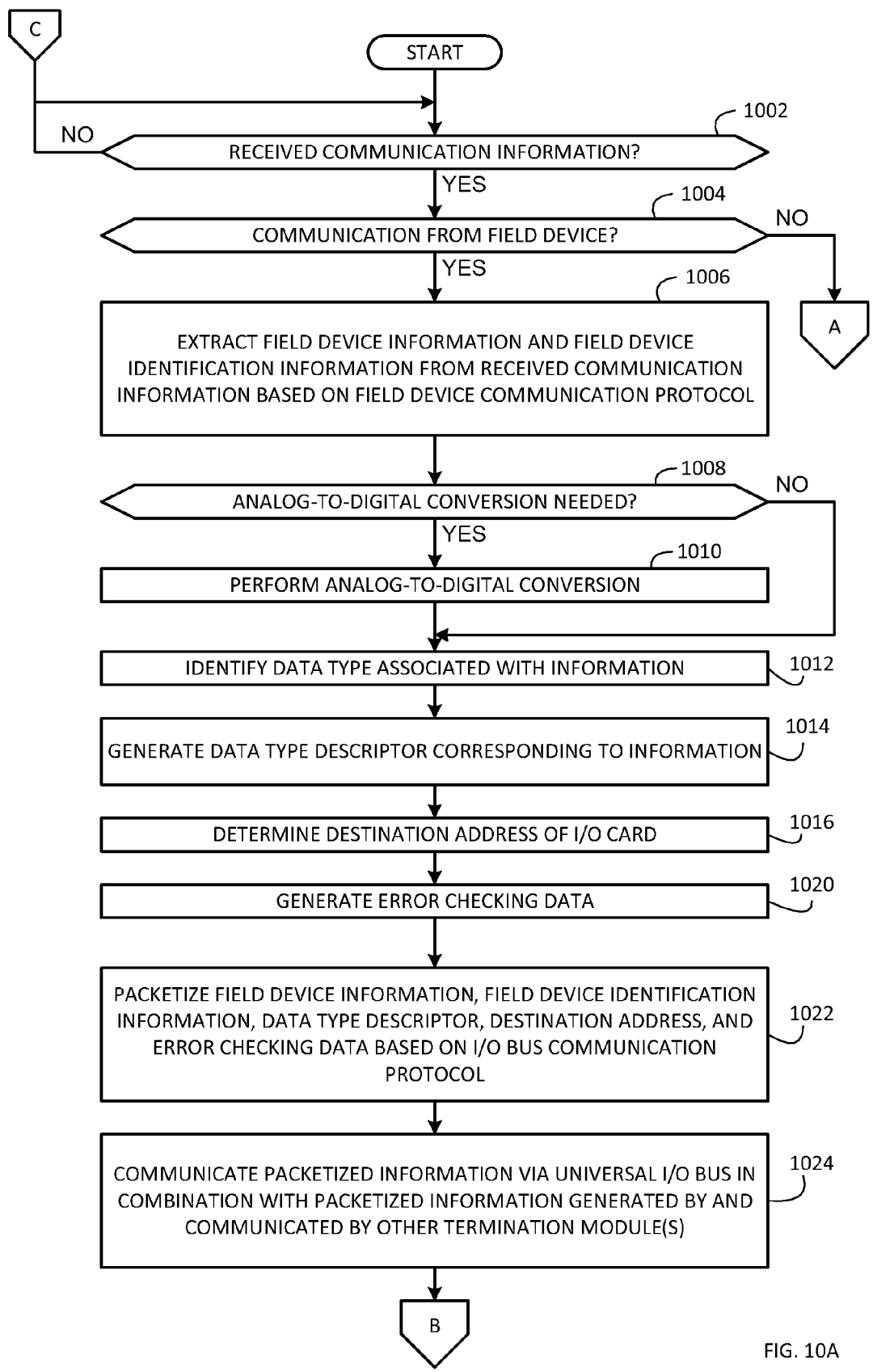
FIGS. 10A and 10B depict a flowchart of an example method that may be used to implement the termination modules of FIGS. 1A, 2-6, 13A-B, and 14A-B to communicate information between field devices and I/O cards.
Figure 10B:
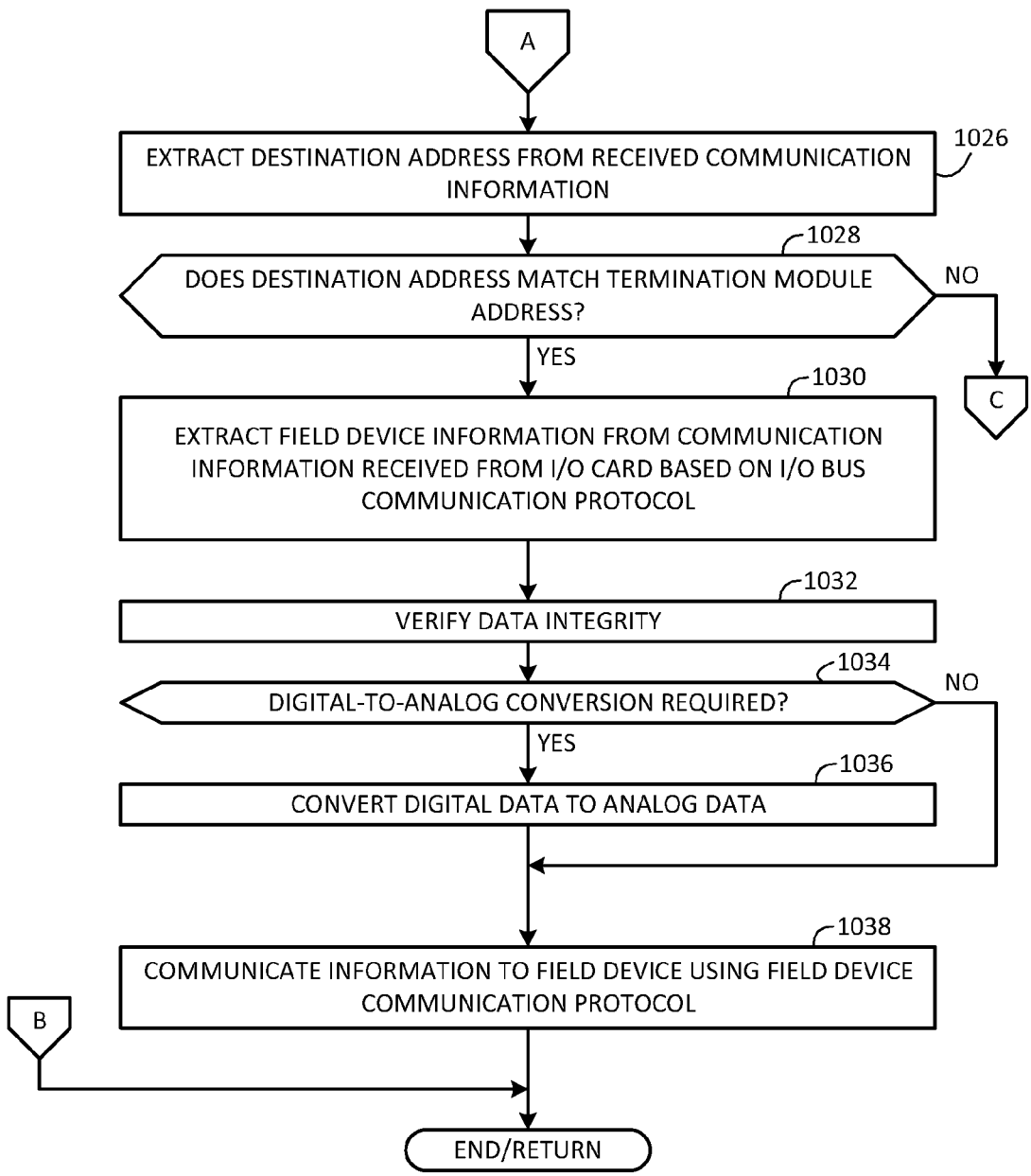

Turning in detail to FIGS. 10A and 10B, the example method of FIGS. 10A and 10B is described in connection with the example termination module 124a of FIGS. 1A, 2, and 4-6. However, the example method of FIGS. 10A and 10B may be used to implement any other termination module. The flowchart of FIGS. 10A and 10B is used to describe how the example termination module 124a communicates information between the field device 112a and the I/O card 132a. Initially, the termination module 124a determines whether it has received communication information (block 1002). For example, the termination module 124a determines that it has received communication information if the I/O bus communication processor 608 (FIG. 6) or the field device communication processor 620 indicates via, for example, an interrupt or a status register that communication information has been received. If the termination module 124a determines that it has not received communication information (block 1002), control remains at block 1002 until the termination module 124a receives communication information.

If the termination module 124a receives communication information (block 1002), the termination module 124a determines whether it received the communication information from a field device (e.g., the field device 112a of FIG. 1A) (block 1004) based on, for example, an interrupt or status register of the field device communication processor 620 (FIG. 6). If the termination module 124a determines that it has received communication information from the field device 112a (block 1004), then the field device communication processor 620 extracts the field device information and the field device identification information from the received communication information associated with the field device 112a based on a field device communication protocol (block 1006). The field device information may include, for example, field device identification information (e.g., device tags, electronic serial numbers, etc.), field device status information (e.g., communication status, diagnostic health information (open loop, short, etc.)), field device activity information (e.g., process variable (PV) values), field device description information (e.g., field device type or function such as, for example, valve actuator, temperature sensor, pressure sensor, flow sensor, etc.), field device connection configuration information (e.g., multi-drop bus connection, point-to-point connection, etc.), field device bus or segment identification information (e.g., field device bus or field device segment via which field device is communicatively coupled to termination module), and/or field device data type information (e.g., analog in (AI) data types, analog out (AO) data types, discrete in (DI) data types (e.g., digital in data types), discrete out (DO) data types (e.g., digital out data types), etc.). The field device communication protocol may be any protocol (e.g., a Fieldbus protocol (e.g., FF-H1), a HART protocol, an AS-I protocol, a Profibus protocol (e.g., Profibus PA), etc.) used by the field device 112a. In an alternative example implementation, at block 1006, the field device communication processor 620 only extracts the field device information from the received communication information and the field device identification information identifying the field device 112a is stored in the termination module 124a. For example, when the field device 112a is initially connected to the termination module 124a, the field device 112a can communicate its identification information to the termination module 124a and the termination module 124a can store the identification information.

The field device communication processor 620 then determines whether an analog-to-digital conversion is needed (block 1008). For example, if the field device 112a communicates analog measurement values, the field device communication processor 620 determines that an analog to digital conversion is needed or required (block 1008). If an analog to digital conversion is required, the analog-to-digital converter 618 (FIG. 6) performs the conversion on the received information (block 1010).

After the analog-to-digital conversion (block 1010) or if no analog-to-digital conversion is required (block 1008), the field device communication processor 620 identifies the data type (e.g., analog, digital, temperature measurement, etc.) associated with the received field device information (block 1012) and generates a data type descriptor corresponding to the received field device information (block 1014). For example, the termination module 124a can store a data type descriptor that indicates the data type that it will always receive from the field device 112a or the field device 112a can communicate a data type to the termination module 124a that the field device communication processor 620 uses to generate the data type descriptor at block 1010.

The I/O bus communication processor 608 (FIG. 6) determines the destination address of the I/O card 132a (block 1016) to which the termination module 124a is to communicate the information received from the field device 112a. For example the communication processor 608 (FIG. 6) can obtain the destination address of the I/O card 132a from the address identifier 604 (FIG. 6). In addition, the I/O bus communication processor 608 determines or generates error checking data (block 1020) to communicate to the I/O card 132a to ensure that the field device information is received by the I/O card 132a without errors. For example, the I/O bus communication processor 608 can generate cyclical error check (CRC) error checking bits.

The I/O bus communication processor 608 then packetizes the field device information, the field device identification information, the data type descriptor, the destination address of the I/O card 132a, the source address of the termination module 124a, and the error checking data based on an I/O bus communication protocol (block 1022). The I/O bus communication protocol may be implemented using, for example, a TPC-based protocol, a UDP-based protocol, etc. The I/O bus communication processor 608 can obtain the source address of the termination module 124a from the address identifier 604 (FIG. 6). The I/O bus interface 602 (FIG. 6) then communicates the packetized information via the universal I/O bus 136a (FIGS. 1A and 2) in combination with packetized information generated by and communicated by other termination modules (e.g., the termination modules 124b and 124c of FIG. 1A) (block 1024). For example, the I/O bus interface 602 may be provided with an arbitration circuit or device that sniffs or monitors the universal I/O bus 136a to determine when the universal I/O bus 136a is available (e.g., is not being used by the termination modules 124b-c) to communicate the information from the termination module 124a to the I/O card 132a.

If the termination module 124b determines at block 1004 that the communication information detected at block 1002 is not from the field device 112a (e.g., the communication information is from the I/O card 132a), the I/O bus communication processor 608 (FIG. 6) extracts a destination address from the received communication information (block 1026). The I/O bus communication processor 608 then determines if the extracted destination address matches a destination address of the termination module 124a (block 1028) obtained from the address interface 604. If the destination address does not match the address of the termination module 124a (e.g., the received information was not intended for delivery to the termination module 124a) (block 1028), control returns to block 1002 (FIG. 10A). Otherwise, if the destination address matches the address of the termination module 124a (e.g., the received information was intended for delivery to the termination module 124a) (block 1028), the I/O bus communication processor 608 extracts the field device information from the received communication information based on the I/O bus communication protocol (block 1030) and verifies the integrity of the data (block 1032) using, for example, a CRC verification process based on error detection information in the received communication information. Although not shown, if the I/O bus communication processor 608 determines at block 1032 that an error exists in the received communication information, the I/O bus communication processor 608 sends a message to the I/O card 132a requesting a re-transmit.

After verifying the data integrity (block 1032), the I/O bus communication processor 608 (or the field device communication processor 620) determines whether a digital-to-analog conversion is required (block 1034). For example, if a data type descriptor stored in the termination module 124a indicates that the field device 112a requires analog information, then the I/O bus communication processor 608 determines that a digital-to-analog conversion is required (block 1034). If a digital-to-analog conversion is required (block 1034), the digital-to-analog converter 616 (FIG. 6) performs the digital-to-analog conversion on the field device information (block 1036). After the digital-to-analog conversion is performed (block 1036) or if no digital-to-analog conversion is required (block 1034), the field device communication processor 620 communicates the field device information to the field device 112a via the field device interface 622 (FIG. 6) using the field device communication protocol of the field device 112a (block 1038).

After the field device communication processor 620 communicates the field device information to the field device 112a or after the I/O bus communication processor 608 communicates the field device information to the I/O card 132a, the process of FIGS. 10A and 10B is ended and/or control is returned to, for example, a calling process or function.

Figure 11A:
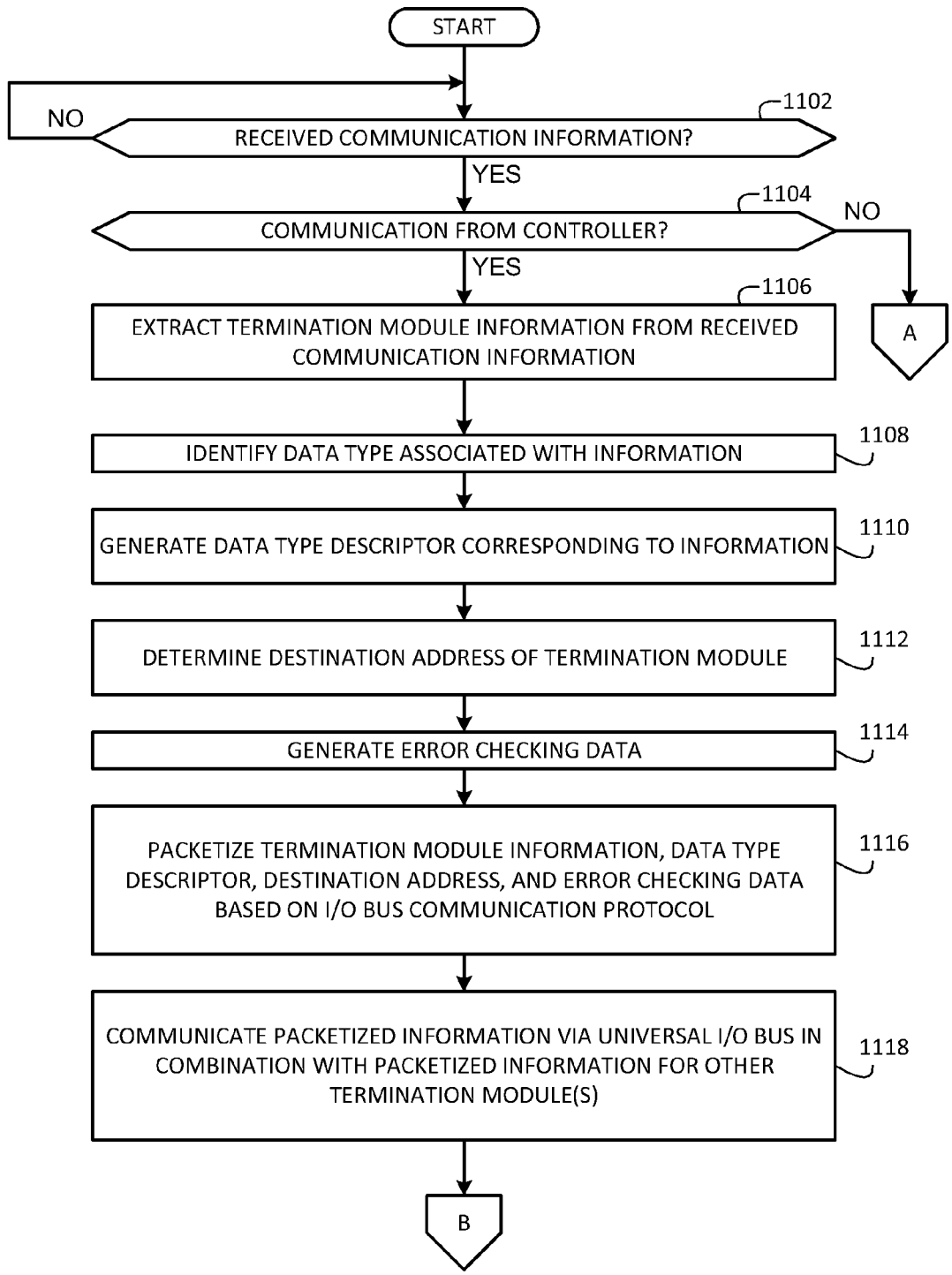
FIGS. 11A and 11B depict a flowchart of an example method that may be used to implement the I/O cards of FIG. 1A to communicate information between the termination modules and a workstation.
Figure 11B:
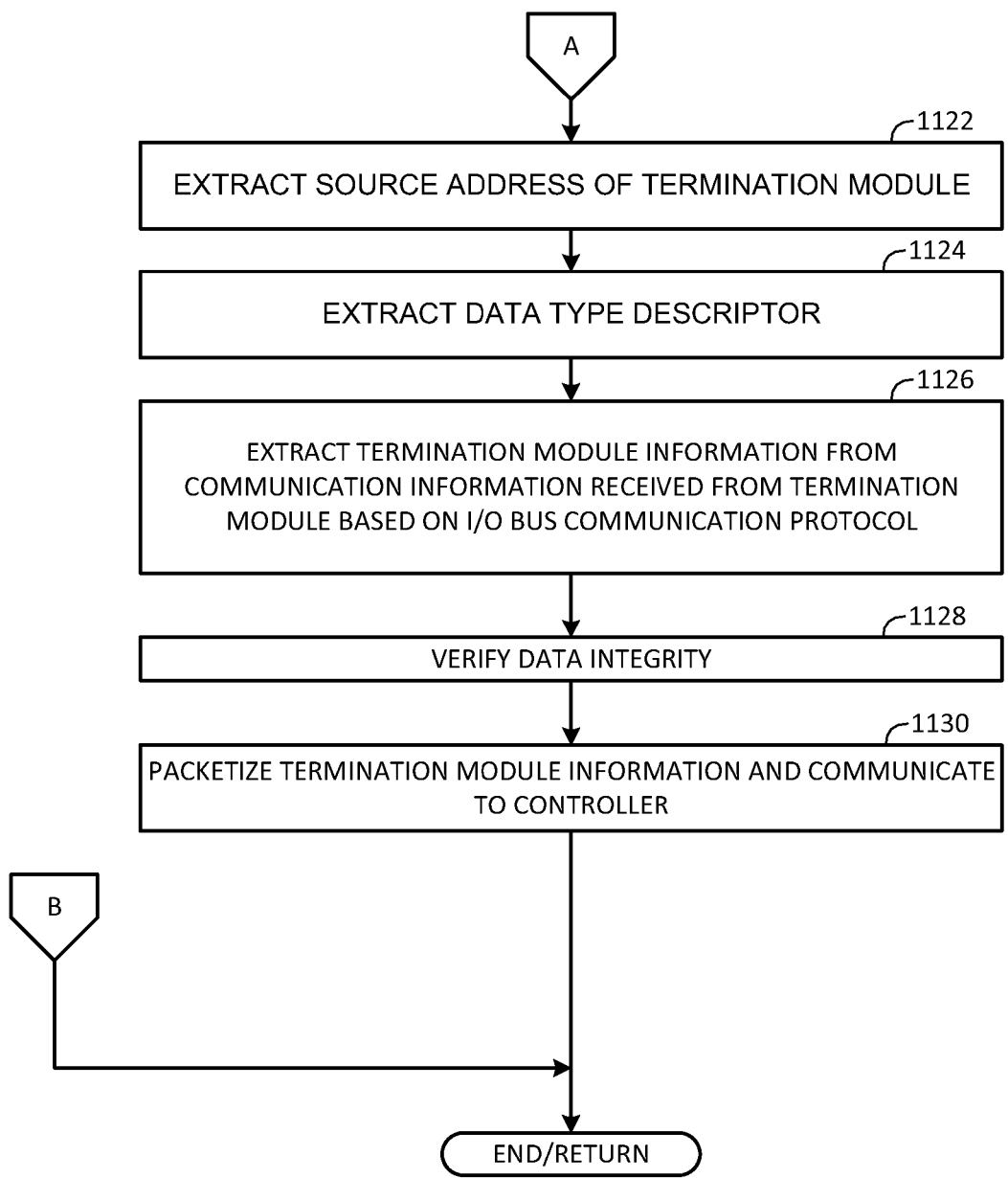

FIGS. 11A and 11B depict a flowchart of an example method that may be used to implement the I/O card 132a of FIG. 1A to exchange information between termination module 124a and the controller 104 of FIG. 1A. Initially, the I/O card 132a determines whether it has received communication information (block 1102). For example, the I/O card 132a determines that it has received communication information if the communication processor 704 (FIG. 7) indicates via, for example, an interrupt or a status register that it has received communication information. If the I/O card 132a determines that it has not received communication information (block 1102), control remains at block 1102 until the I/O card 132a receives communication information.

If the I/O card 132a receives communication information (block 1102), the I/O card 132a determines whether it received the communication information from the controller 104 (FIG. 1A) (block 1104) based on for example an interrupt or status register of the communication processor 704. If the I/O card 132a determines that it has received communication information from the controller 104 (block 1104), then the communication processor 704 extracts the termination module information (which may include field device information) from the received communication information associated with the termination module 124a (block 1106).

The communication processor 704 identifies the data type (e.g., field device analog information, field device digital information, termination module control information to control or configure the termination module, etc.) associated with the received termination module information (block 1108) and generates a data type descriptor corresponding to the received termination module information (block 1110). In an alternative example implementation, the data type descriptor is generated at the workstation 102 (FIG. 1A) and the communication processor 704 need not generate the data type descriptor.

The I/O bus communication processor 712 (FIG. 7) then determines the destination address of the termination module 124a (block 1112). In addition, the I/O bus communication processor 712 determines error checking data (block 1114) to communicate to the termination module 124a with the termination module information to ensure that the termination module 124a receives the information without errors. For example, the I/O bus communication processor 712 can generate cyclical error check (CRC) error checking bits.

The I/O bus communication processor 712 then packetizes the termination module information, the data type descriptor, the destination address of the termination module 124a, the source address of the termination module 124a, and the error checking data based on the I/O bus communication protocol (block 1116). The I/O bus interface 710 (FIG. 7) then communicates the packetized information via the universal I/O bus 136a (FIGS. 1A and 2) in combination with packetized information destined for other termination modules (e.g., the termination modules 124b and 124c of FIG. 1A) (block 1118). For example, the I/O bus communication processor 704 may packetize other termination module information using the destination addresses of, for example, the termination modules 124b and 124c and communicate termination module information for all of the termination modules 124a-c via the universal I/O bus 136a using the RS-485 standard. Each of the termination modules 124a-c can extract its respective information from the universal I/O bus 136a based on the destination addresses provided by the I/O card 132a.

If the I/O card 132a determines at block 1104 that the communication information detected at block 1102 is not from the controller 104 (e.g., the communication information is from the one of the termination modules 124a-c), the I/O bus communication processor 712 (FIG. 7) extracts a source address (e.g., a source address of one of the termination modules 124a-c) from the received communication information (block 1122). The I/O bus communication processor 712 then extracts a data type descriptor (e.g., digitally encoded analog data type, digital data type, temperature data type, etc.) (block 1124). The I/O bus communication processor 712 also extracts the termination module information (which may include field device information) from the received communication information based on the I/O bus communication protocol (block 1126) and verifies the integrity of the data (block 1128) using, for example, a CRC verification process based on error detection information in the received communication information. Although not shown, if the I/O bus communication processor 712 determines at block 1128 that an error exists in the received communication information, the I/O bus communication processor 712 sends a re-transmit request message to the termination module associated with the source address obtained at block 1122.

After verifying the data integrity (block 1128), the communication processor 704 packetizes the termination module information (using the source address of the termination module and the data type descriptor) and the communication interface 702 communicates the packetized information to the controller 104 (block 1130). If the information is intended to be delivered to the workstation 102, the controller 104 can subsequently communicate the information to the workstation 102. After the communication interface 702 communicates the information to the controller 104 or after the I/O bus interface 710 communicates the termination module information to the termination module 124*a*, the process of FIGS. 11A and 11B is ended and/or control is returned to, for example, a calling process or function.

Figure 12:
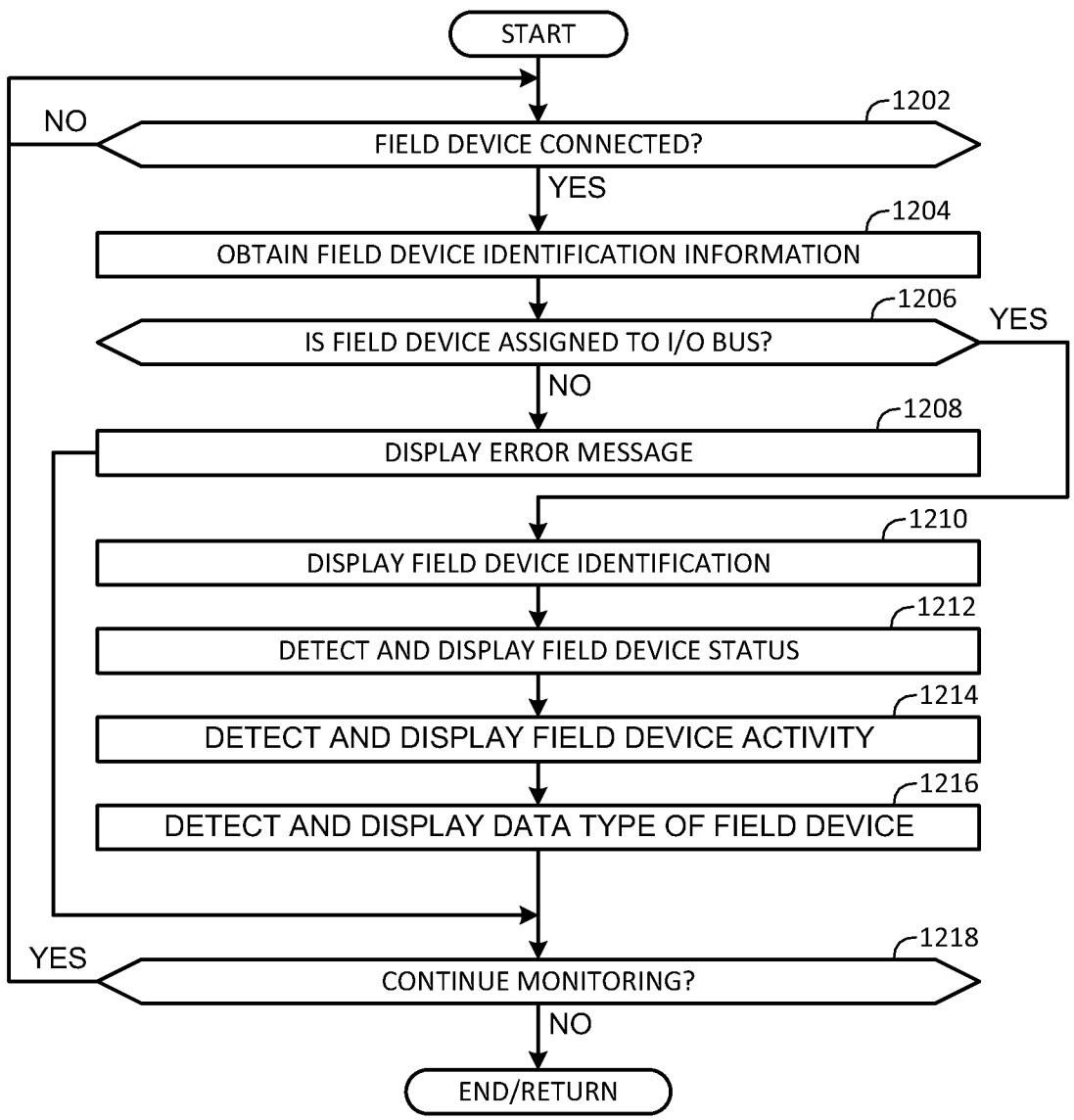
FIG. 12 is a flowchart of an example method that may be used to implement the labeler of FIGS. 2, 3, 6, and 8 to retrieve and display information associated with field devices communicatively coupled to termination modules.

FIG. 12 is a flowchart of an example method that may be used to implement the labeler 214 of FIGS. 2, 3, and 8 to retrieve and display information associated with field devices (e.g., the field device 112*a* of FIG. 1A) communicatively coupled to termination modules (e.g., the termination module 124*a* of FIGS. 1, 2, and 4-6). Initially, the connection detector 806 (FIG. 8) determines whether a field device (e.g., the field device 112*a*) is connected to the termination module 124*a* (e.g., connected to the termination screws 406 of FIGS. 4 and 5 and/or the field device interface 622 of FIG. 6) (block 1202). If the connection detector 806 determines that the field device 112*a* (or any other field device) is not connected to the termination module 124*a* (block 1202) control remains at block 1202 until the connection detector 806 determines that the field device 112*a* (or any other field device) is connected to the termination module 124*a*.

If the connection detector 806 determines that the field device 112*a* is connected to the termination module 124*a* (block 1202), the field device identifier 814 obtains field device identification information (e.g., a device tag value, a device name, an electronic serial number, etc.) that identifies the field device 112*a* (block 1204). For example, the field device identifier 814 can send the field device 112*a* a query requesting the field device 112*a* to transmit its field device identification information. In another example implementation, upon initial connection to the termination module 124*a*, the field device 112*a* can automatically communicate its field device identification information to the field device identifier 814.

The field device identifier 814 then determines if the field device 112*a* is assigned to communicate via the universal I/O bus 136*a* with the I/O card 132*a* (block 1206) based on the field device identification information. For example, the field device identifier 814 can communicate the field device identification information to the I/O card 132*a* via the termination module 124*a* and the I/O card 132*a* can compare the field device identification information with field device identification numbers stored in the data structure 133 (FIG. 1A) or in a similar data structure stored in the workstation 102. The data structure 133 can be populated by engineers, operators, or users with field device identification numbers of field devices (e.g., the field devices 112*a-c*) that are to communicate with the I/O card 132*a* via the universal I/O bus 136*a*. If the I/O card 132*a* determines that the field device 112*a* is assigned to the I/O bus 136*a* and/or the I/O card 132*a*, the I/O card 132*a* communicates a confirmation message to the field device identifier 814.

If the field device identifier 814 determines that the field device 112*a* is not assigned to communicate via the I/O bus 136*a* (block 1206), the display interface 808 (FIG. 8) displays an error message (block 1208). Otherwise, the display interface 808 displays the field device identification information (block 1210). In the illustrated example, the field device status detector 812 detects the field device status (e.g., device on, device off, device error, etc.) and the display interface 808 displays the status information (block 1212). In addition, the field device activity detector 810 (FIG. 8) detects the activity of the field device 112*a* (e.g., measurement and/or monitoring information) and the display interface 808 displays the activity information (block 1214). Also, the data type detector 816 (FIG. 8) detects the data type (e.g., analog, digital, etc.) of the field device 112*a* and the display interface 808 displays the data type (block 1216).

After the display interface 808 displays the error message (block 1208) or after the display interface 808 displays the data type (block 1216), the labeler 214 determines whether it should continue monitoring (block 1218) based on, for example, whether the termination module 124*a* has been turned off or unplugged from the marshalling cabinet 122 (FIGS. 1A and 2). If the labeler 214 determines that it should continue monitoring, control is passed back to block 1202. Otherwise, the example process of FIG. 12 is ended and/or control is returned to a calling function or process.

Figure 13A:
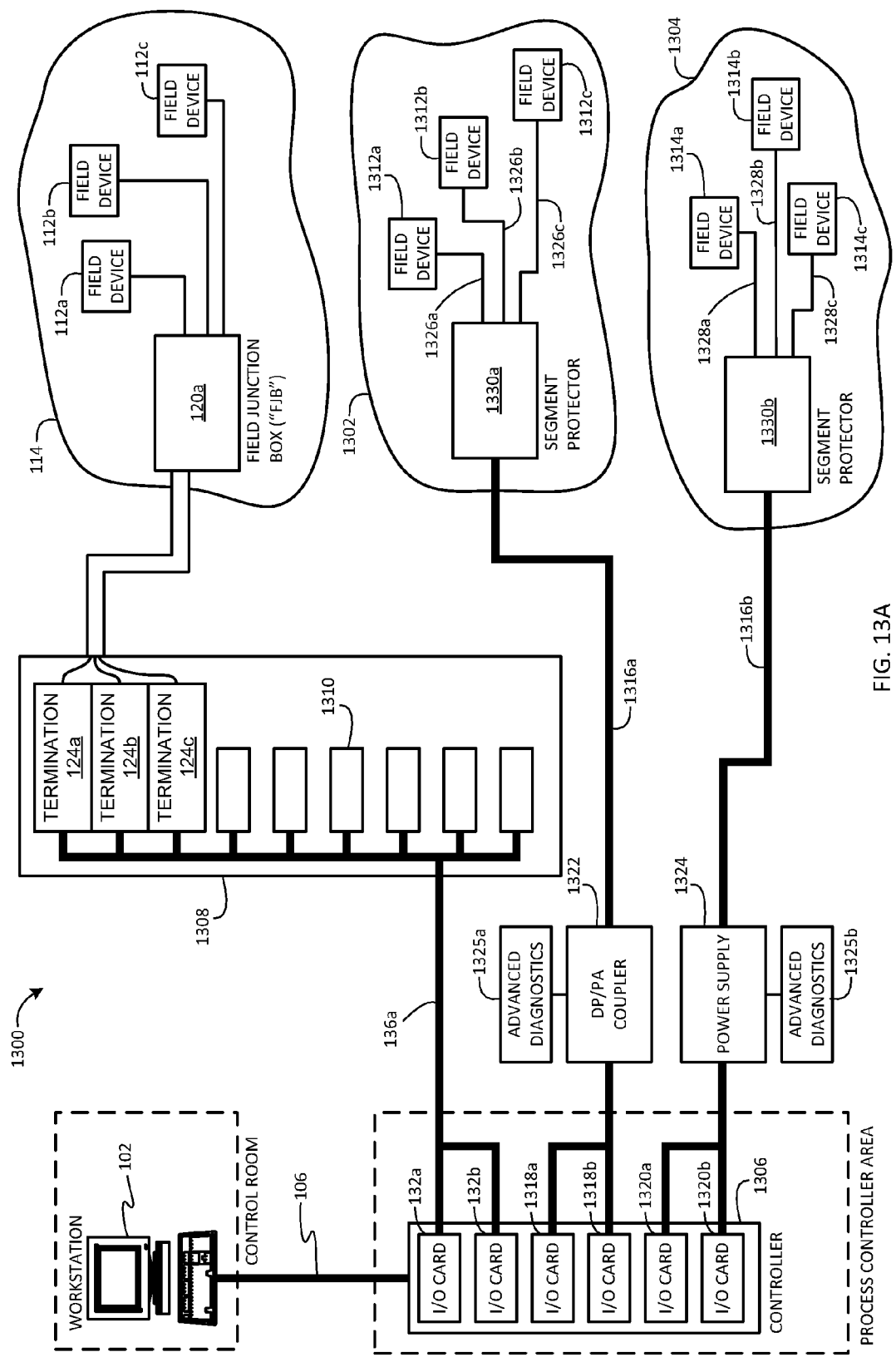
FIGS. 13A and 13B are block diagrams illustrating another example process control system before and after implementing the teachings disclosed herein with respect to an example Profibus PA process area and an example FOUNDATION Fieldbus H1 (FF-H1) process area.
Figure 13B:
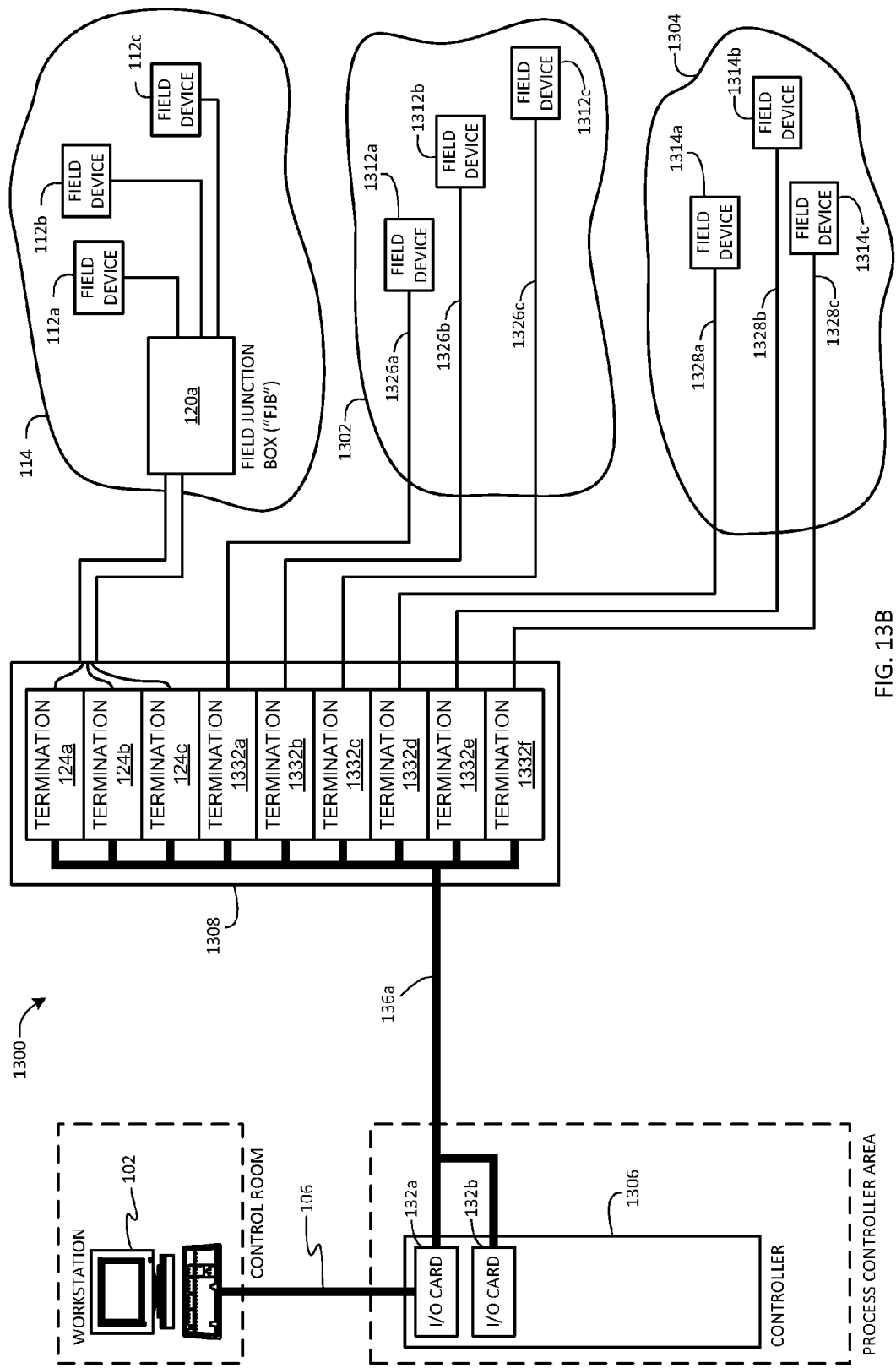

FIGS. 13A-B are block diagrams illustrating an example process control system 1300 before and after implementing the teachings disclosed herein with respect to an example Profibus PA process area 1302 and an example FOUNDATION Fieldbus H1 (FF-H1) process area 1304. While it may be uncommon for a process control system to include both Profibus PA and FOUNDATION fieldbus process areas, both are shown in the illustrated example for purposes of explanation. Further, for purposes of explanation, the example process control system 1300 of FIGS. 13A-B is described using the same reference numerals for common parts described in connection with the example process control system 100 of FIG. 1A. Thus, in the illustrated example of FIG. 13A, the process control system 1300 includes the workstation 102 communicatively coupled to a controller 1306 via the LAN 106. The example controller 1306 may be substantially similar or identical to any one of the controllers 104, 152, 162 of FIGS. 1A-C. Further, the example process control system 1300 includes the first process area 114 associated with the field devices 112*a-c*, which are communicatively coupled to the termination modules 124*a-c* within an example marshalling cabinet 1308. The example marshalling cabinet may be substantially similar or identical to either of the marshalling cabinets 122, 300 of FIGS. 1A, 2 and 3. The termination modules 124*a-c* are communicatively coupled to the I/O cards 132*a-b* within the controller 1306 via the first universal I/O bus 136*a*. Further, in the illustrated example, the marshalling cabinet 1308 includes a socket rail 1310 to receive additional termination modules substantially similar or identical to the socket rail 202*a-b*, 308*a-b* described above in connection with FIGS. 2 and 3.

In the illustrated example of FIG. 13A, the example process control system 100 includes field devices 1312*a-c* in the Profibus PA process area 1302 and field devices 1314*a-c* in the FF-H1 process control area 1304 implemented using traditional fieldbus architectures and components (both Profibus PA and FF-H1 are protocols associated with the family of fieldbus protocols). Thus, the field devices 1312a-c and 1314a-c are communicatively coupled to the controller 1306 via corresponding trunks or segments 1316a-b. Typically, a fieldbus trunk or segment is a single cable including a twisted pair of wires that carry both digital signals and DC power to connect multiple field devices with a distributed control system (DCS) or other control system host. Due to various constraints, a fieldbus segment is typically limited to a maximum length of 1900 meters and can connect up to 16 different field devices. As shown in the illustrated example, the segments 1316a-b are communicatively coupled to corresponding I/O cards 1318a-b and 1320a-b within the controller 1306. In the illustrated example, each of the segments 1316a-b is coupled to two I/O cards 1318a-b or 1320a-b to provide redundancy. In some examples, the I/O cards 1318a-b and/or 1320a-b may reside in different controllers separate from each other and/or separate from the I/O cards 132a-b associated with the field devices 112a-c of the first process area 114.

In the illustrated example of FIG. 13A, the segment 1316a corresponding to the example Profibus PA process area 1302 is coupled to the I/O cards 1318a-b via a DP/PA segment coupler 1322. Likewise, the segment 1316b corresponding to the example FF-H1 process area 1304 is coupled to the I/O cards 1320a-b via a power supply 1324. In some examples, the DP/PA segment coupler 1322 and the power supply 1324 provide power conditioning functionality on the respective segments 1316a-b. Additionally, in the illustrated example, the DP/PA segment coupler 1322 and the power supply 1324 are coupled to respective advanced diagnostic modules 1325a-b that can monitor the physical layer of the corresponding segments 1316a-b as well as communications over the segments 1316a-b during operation.

In the illustrated example, the field devices 1312a-c and 1314a-c are coupled to the corresponding segment 1316a-b via respective spurs 1326a-c and 1328a-c. In a fieldbus architecture, each spur connects the corresponding field device to the segment in parallel. As such, in many process control systems as shown in the illustrated example, each spur 1326a-c and 1328a-c is coupled to the corresponding segment 1316a-b via a segment protector 1330a-b (sometimes referred to as a device coupler or field barrier) to provide short-circuit protection against a short in any one of the field devices 1312a-c and 1314a-c shorting the entire segment. In some examples, the segment protectors 1330a-b limit the current (e.g., to 40 mA) on each spur 1326a-c and 1328a-c. In some examples, the segment protectors 1330a-b also serve to properly terminate each segment 1316a-b at the end near the field devices while the DP/PA segment coupler 1322 and power supply 1324 serve to terminate the segments 1316a-b at the end near the controller. Without proper termination at both ends of the segments 1316a-b, communication errors may occur due to signal reflection.

While fieldbus architectures, as described above, provide many advantages, they also pose challenges in terms of complexity and cost in implementation. For example, the complexity of fieldbus systems necessitates engineers to carefully design each segment taking into account, among other things, the number of devices to be served by each segment, the lengths of cable needed, and the power requirements involved, while ensuring each segment is properly terminated and protected against short circuits, open circuits, and/or other segment failures. In addition to the time and cost to initially configure such fieldbus architectures, there are additional costs associated with the many components associated with such implementations including the DP/PA segment coupler 1322 or power supply 1324, the segment protector 1330a-b, the lengths of segment cable (including, in some instances, multiple cables for redundancy), and the I/O cards 1318a-b and 1320a-b. However, through the implementation of the teachings disclosed herein, the design complexity and costs involved with the implementation and maintenance of fieldbus systems is significantly reduced.

FIG. 13B is a block diagram illustrating the example process control system 1300 of FIG. 13A after implementing the teachings disclosed herein. As shown in the illustrated example, the spurs 1326a-c and 1328a-c of the field devices 1312a-c and 1314a-c are communicatively coupled directly to respective termination modules 1332a-f that have been plugged into sockets on the socket rail 1310 of the marshalling cabinet 1308 shown in FIG. 13A. That is, in contrast to the typical topology of fieldbus devices in a multi-drop architecture, in the illustrated example, each fieldbus compliant field device 1312a-c and 1314a-c is in point-to-point communication with a respective termination module 1332a-f. The termination modules 1332a-f may be substantially similar or identical to the termination modules 124a-c and 126a-c described above to enable communications between the field devices 1312a-c and 1314a-c and the I/O cards 132a-b via the universal I/O bus 136a in the same manner as described above. In this manner, the need for the separate I/O cards 1318a-b and 1320a-b (FIG. 13A) specific to the corresponding fieldbus protocol (e.g., Profibus PA or FF-H1) associated with the process areas 1302, 1304 is eliminated and any type(s) of field devices and associated I/Os can be combined in a single marshalling cabinet 1308. Likewise, the need for the cable trunks or segments 1316a-b (FIG. 13A) is eliminated along with any associated insulation. Furthermore, in some examples, the universal I/O bus 136a provides a high-speed communication backbone (e.g., via a fiber optic cable) for much faster communications than the relatively slow communication backbone of a typical copper-based fieldbus segment. Further still, in some examples, the universal I/O bus 136a can carry communications for up to 96 field devices, whereas a typical fieldbus segment is limited to connecting 16 devices. Thus, the number of wires coupled to the controller for the same number of field devices is significantly reduced.

While multiple field devices may, in some examples, be configured in a multi-drop configuration communicatively coupled to a single termination module 1332a-f as is common for fieldbus architectures, the point-to-point or single loop architecture shown in the illustrated example provides several advantages and simplifications over traditional fieldbus schemes. For example, with the field devices 1312a-c and 1314a-c wired as shown in the illustrated example, the termination modules 1332a-f may provide power and power conditioning functionality (e.g., via the field power controller 610 described in connection with FIG. 6) to each field device. In this manner, the separate DP/PA segment coupler 1322 and/or the power supply 1324 shown in FIG. 13A are no longer needed. Additionally or alternatively, in some examples, the marshalling cabinet 1308 includes a power conditioner substantially similar or identical to the power conditioner 218 (FIG. 2) to eliminate the need for the separate DP/PA segment coupler 1322 and/or the power supply 1324 shown in FIG. 13A. Furthermore, in such examples, because the power supply is local to the field devices in the illustrated example (e.g., within the marshalling cabinet 1308), the power requirements are lower than a power supply providing power along a typical fieldbus segment (e.g., due to the voltage drop arising from the length of the cable). Further still, in some examples, the termination modules 1332a-f (e.g., via a corresponding field power controller 610) provide short circuit protection and limit the current for each spur 1326*a*-*c* and 1328*a*-*c*, thereby eliminating the need for the separate segment protectors 1330*a*-*b*.

Additionally, individually coupling the field devices 1312*a*-*c* and 1314*a*-*c* to separate termination modules 1332*a*-*f* provides single loop integrity such that the concern for proper termination at issue in typical fieldbus architectures is less of a concern. Furthermore, the direct point-to-point connection between each field device 1312*a*-*c* and 1314*a*-*c* and the corresponding termination module 1332*a*-*f* significantly reduces the complexity and design work involved in developing and implementing a typical fieldbus segment because the signals from each field device are separately received and handled or marshalled electronically on the back end. Accordingly, the costs of acquiring, configuring, and maintaining the many components in a typical fieldbus architecture as well as the time and expense in designing such architectures and ensuring their proper operation is greatly reduced through the implementation of the teachings disclosed herein. In other words, in some examples, fieldbus compliant devices may be incorporated into a process control system without any of a DP/PA coupler and/or a power supply on a segment (e.g., other than the power supply and/or power conditioner in the marshalling cabinet 122 and/or in the termination modules 1332*a*-*f*), without a segment protector, without protocol specific I/O cards, and without any significant segment design work.

Additionally, in some examples, the termination modules 1332*a*-*f* provide advanced diagnostics (e.g., via the fieldbus diagnostics analyzer 624 of FIG. 6) without a separate advanced diagnostic module 1325*a*-*b*. Furthermore, in some examples, the diagnostics performed by the termination modules 1332*a*-*f* may be more reliable and/or robust than known advanced diagnostic modules because each termination module 1332*a*-*f* only needs to monitor a single field device via a point-to-point connection rather than multiple devices on a typical fieldbus segment.

Profibus PA and FF-H1 are both fieldbus protocols with the same physical layer. Accordingly, in some examples, the termination modules 1332*a*-*c* associated with the field devices 1312*a*-*c* in the Profibus PA process area 1302 are identical to the termination modules 1332*d*-*f* associated with the field devices 1314*a*-*c* in the FF-H1 process area 1304. Put another way, in some examples, the spurs 1326*a*-*c* connected to the termination modules 1332*a*-*c* could be connected to the termination modules 1332*d*-*f* while the spurs 1328*a*-*c* are connected to the termination modules 1332*a*-*c* instead of the termination modules 1332*d*-*f*. In some such examples, the termination modules 1332*a*-*f* include autosensing functionality to automatically detect the particular protocols (e.g., either Profibus PA or FF-H1) associated with the particular field device 1312*a*-*c* and 1314*a*-*c* to which the termination modules 1332*a*-*f* are connected. As a result, process control system engineers are free to use any desirable fieldbus device regardless of the associated communication protocol (and may even mix devices compliant with different protocols) without concern for having to design a separate fieldbus segment or acquire the corresponding components required to implement such fieldbus segments.

In some examples, the termination modules 1332*a*-*f* are constructed to be intrinsically safe (e.g., in compliance with the Fieldbus Intrinsically Safe Concept (FISCO)) to implement the field devices 1312*a*-*c* and 1314*a*-*c* in hazardous environments. In such examples, the socket rail 1310 of the marshalling cabinet 1308 is also intrinsically safe. In some examples, the termination modules 1332*a*-*f* are constructed for certification as energy limited and/or with a safety rating sufficient to satisfy the Fieldbus Non-Incendive Concept (FNICO). In some such examples, the termination modules 1332*a*-*f* may comply with FNICO requirements even when plugged into a marshalling cabinet with socket rails that are not intrinsically safe.

Additionally or alternatively, in some examples, the termination modules described herein are constructed to communicate with field devices based on communication protocols other bus protocols (e.g., other than Profibus PA or FF-H1). For instance, in some examples, the termination modules may be wired to a WirelessHART gateway to interface with one or more WirelessHART devices using the HART-IP application protocol. Additionally or alternatively, in some examples, wireless devices may be interfaced using other wireless technology standards such as ISA (International Society of Automation) 100.11a or the WIA-PA (Wireless Networks for Industrial Automation—Process Automation). In some examples, the termination modules described herein may be constructed to interface with devices using protocols based on the Internet Protocol (IP) such as, for example, using the 6TiSCH standard (IP version 6 over Time Slotted Channel Hopping (TSCH)). In some examples, the termination modules interface with devices using the Message Queue Telemetry Transport (MQTT) protocol. Further, in some examples, safety field devices may be integrated using a tunnel protocol between the safe environment and the associated safety controller such as, for example, PROFIsafe (Profibus safety).

Figure 14A:
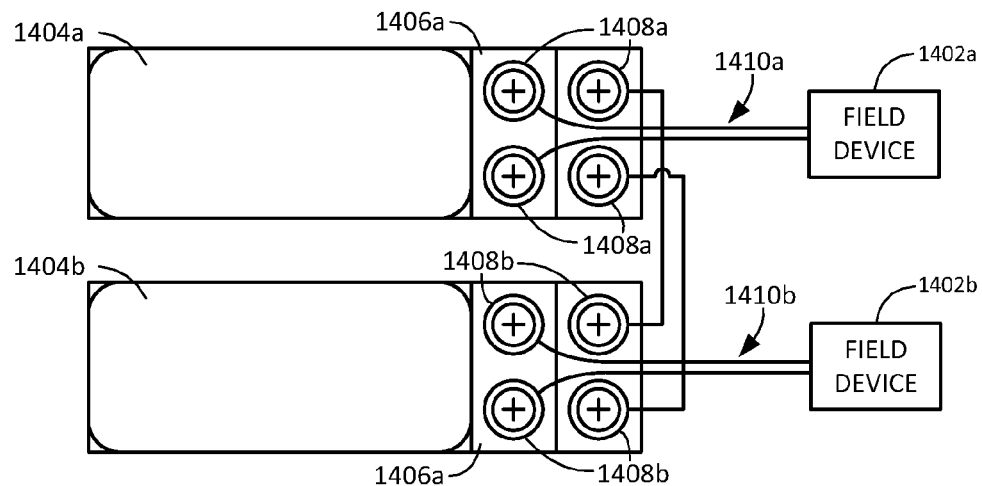
FIGS. 14A and 14B depict alternative example implementations of peer-to-peer communications of two FF-H1 compliant field devices communicatively coupled to corresponding termination modules.
Figure 14B:
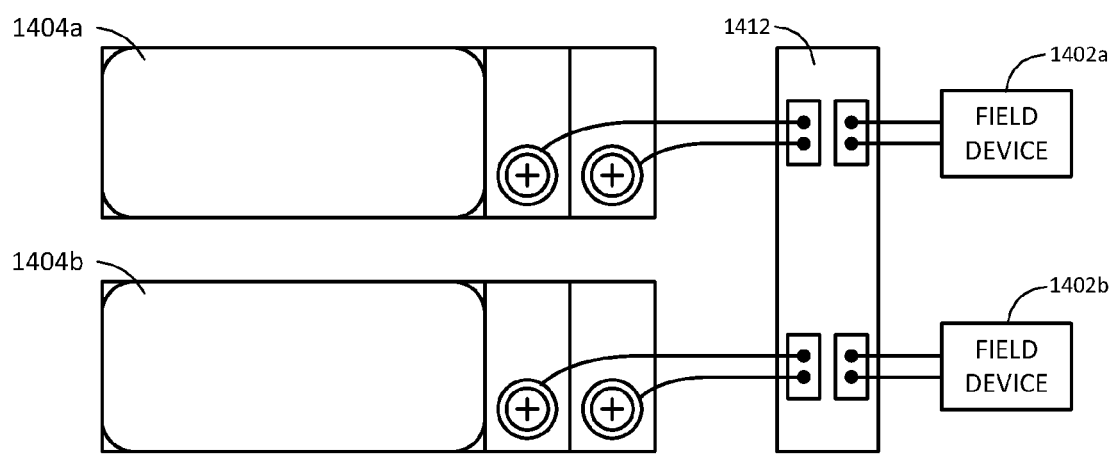

FIGS. 14A and 14B depict alternative example implementations of peer-to-peer communications of two FF-H1 compliant field devices 1402*a*-*b* communicatively coupled to corresponding termination modules 1404*a*-*b*. The example termination modules 1404*a*-*b* may be substantially similar or identical to the termination modules 1332*a*-*f* described above. Although peer-to-peer communications between devices in the field are not provided for using the Profibus PA fieldbus protocol, such communications are possible when using the FF-H1 protocol, thereby enabling control in the field independent of the controller (e.g., the controller 1306 of FIG. 13A). In the illustrated example of FIG. 14A, the termination modules 1404*a*-*b* are coupled to corresponding terminal block bases 1406*a*-*b* substantially similar or identical to the base 402 (FIG. 4) except that the bases 1406*a*-b are shown with four corresponding terminals 1408*a*-*b*. In the illustrated example, the pair of wires for each spur 1410*a*-*b* corresponding to the field devices 1402*a*-*b* are connected to a first pair of the terminals 1408*a*-*b*, whereas corresponding ones of the second pairs of terminals 1408*a*-*b* from each base 1406*a*-*b* are coupled to each other. In this manner, both of the field devices 1402*a*-*b* are communicatively coupled to each of the termination modules 1404*a*-*b* and also communicatively coupled to each other.

The direct coupling of separate field devices 1402*a*-*b* to each of the termination modules 1404*a*-*b*, as shown in the illustrated example of FIG. 14A, is possible because the termination modules 1404*a*-*b* provide independent power conditioning functionality (e.g., via the field device controller 610) for the respective field devices 1402*a*-*b*. That is, the power conditioning provided by each termination module 1404*a*-*b* serves to prevent signals from one of the field devices (e.g., the field device 1402*a*) from disrupting communications with the other field device (e.g., the field device 1402*b*). However, as described above, in some examples, power conditioning is provided by a separate power conditioner 218 for all of the field devices collectively on the same socket rail (e.g., via injected power). In some such examples, as illustrated in FIG. 14B, the field devices 1402*a*-*b* are communicatively coupled with the termination modules 1404*a*-*b* via a segment protector 1412. That is, although each field device 1402*a-b* is still associated with a corresponding termination module 1404*a-b*, peer-to-peer communications between the field devices 1402*a-b* are achieved through the segment protector 1412. Further, the segment protector 1412 prevents the power provided to each field device 1402*a-b* through its corresponding termination module 1404*a-b* from impacting the communications of any of the field devices 1402*a-b*. In the illustrated examples of FIGS. 14A and 14B, additional wiring (e.g., for shielding and/or grounding) has been omitted for the sake of clarity.

Figure 15:
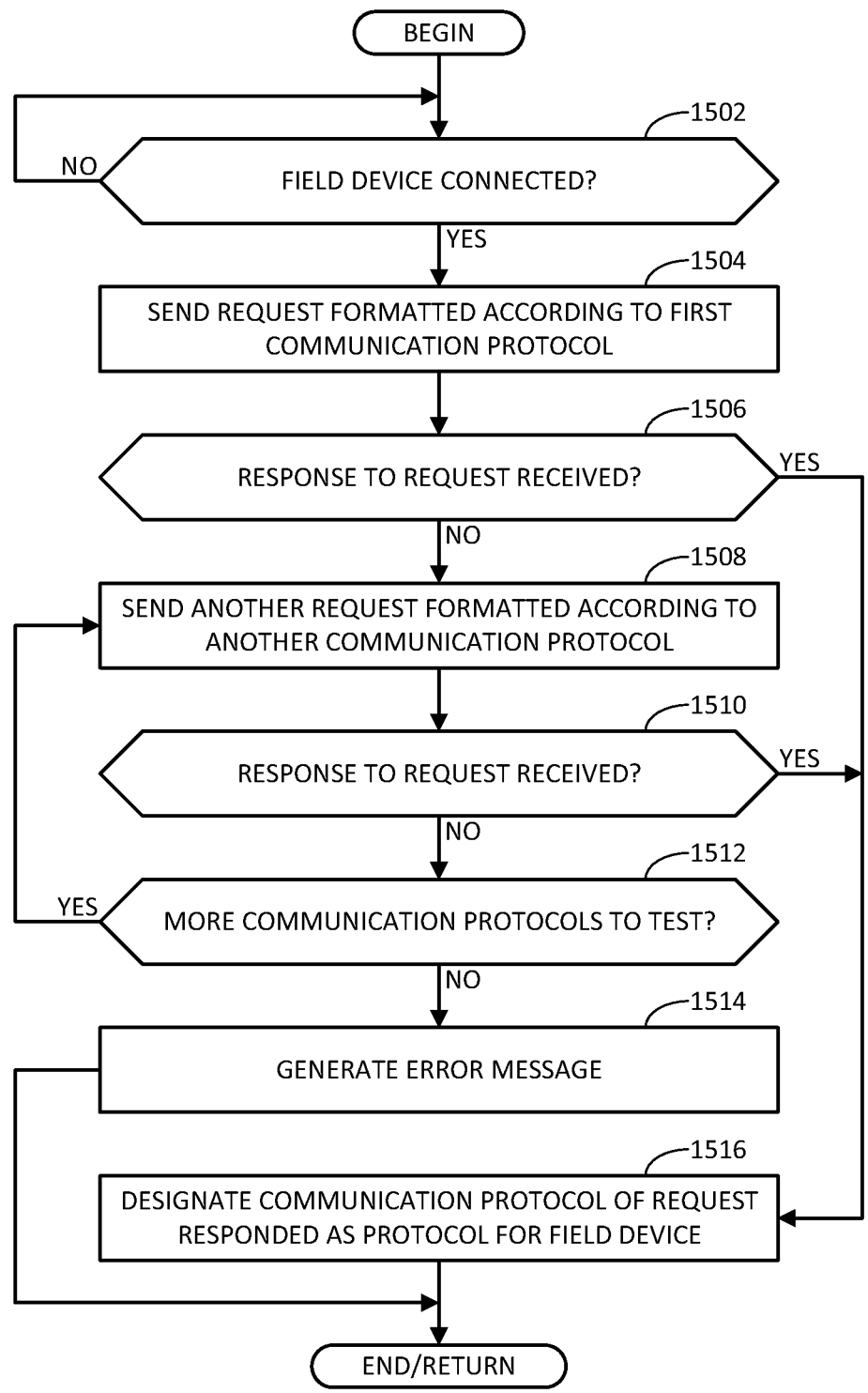
FIG. 15 is a flowchart of an example method that may be used to implement the termination modules of FIGS. 1A, 2-6, 13A-B, and 14A-B to automatically detect the communication protocol associated with the corresponding field devices connected to the termination modules.

The example method of FIG. 15 is described in connection with the example termination module 1332*a* of FIG. 13B. However, the example method of FIG. 15 may be used to implement any other termination module. The flowchart of FIG. 15 is used to describe how the example termination module 1332*a* automatically detects the communication protocol associated with the corresponding field device (e.g., the field device 1312*a*) connected to the termination module 1332*a*. Initially, the termination module 1332*a* determines (e.g., via the connection detector 806 of FIG. 8) whether a field device (e.g., the field device 1312*a*) is connected to the termination module 1332*a* (block 1502). If the termination module 1332*a* determines that the field device 1312*a* (or any other field device) is not connected to the termination module 1332*a* (block 1502) control remains at block 1502 until the termination module 1332*a* determines that the field device 1312*a* (or any other field device) is connected to the termination module 1332*a*.

If the termination module 1332*a* determines that the field device 1312*a* is connected to the termination module 1332*a* (block 1502), the termination module 1332*a* sends a request formatted (e.g., via the field device communication processor 620 of FIG. 6) according to a first communication protocol (e.g., Profibus PA) (block 1504). In some examples, the request may correspond to the query requesting the field device to transmit its field device identification information as described above in connection with block 1204 of FIG. 12. The termination module 1332*a* then determines whether a response to the request is received (block 1506). As described above in connection with block 1504, the request is formatted corresponding to a particular protocol. As a result, the only way that the field device 1312*a* can recognize the request and, thus, respond to the request, is if the field device 1312*a* is associated with the same protocol. Accordingly, if the termination module 1332*a* determines that a response is received (block 1506), the termination module 1332*a* designates the communication protocol of the request responded to as the protocol corresponding to the field device 1312*a* (block 1506). For example, if the first request was formatted according to the Profibus PA protocol and a response to the request is received, the communication protocol corresponding to the field device 1312*a* is designated as Profibus PA.

If the termination module 1332*a* determines at block 1506 that a response to the request is not received, the termination module 1332*a* sends another request formatted (e.g., via the field device communication processor 620) according to another communication protocol (e.g., FF-H1) (block 1508). The termination module 1332*a* then determines whether a response to the request is received (block 1510). If the termination module 1332*a* determines that a response to the request is received (block 1510), the termination module 1332*a* designates the communication protocol of the request responded to as the protocol corresponding to the field device 1312*a* (block 1516). If the termination module 1332*a* determines that a response to the request is not received (block 1510), the termination module 1332*a* determines whether there are more communication protocols to test (e.g., other than Profibus PA and FF-H1 (e.g., HART)). If there are more communication protocols, control returns to block 1508 to send another request formatted according to another communication protocol. If the termination module 1332*a* determines that there are no more communication protocols to test, the termination module 1332*a* generates an error message (block 1514). For example, the error message may indicate that the field device 1312*a* is not responding and/or that the communication protocol associated with the field device 1312*a* cannot be identified.

After the termination module 1332*a* generates an error message (block 1514) or designates the communication protocol of the request responded to as the protocol corresponding to the field device 1312*a* (block 1516), the process of FIG. 15 is ended and/or control is returned to, for example, a calling process or function.

Figure 16:
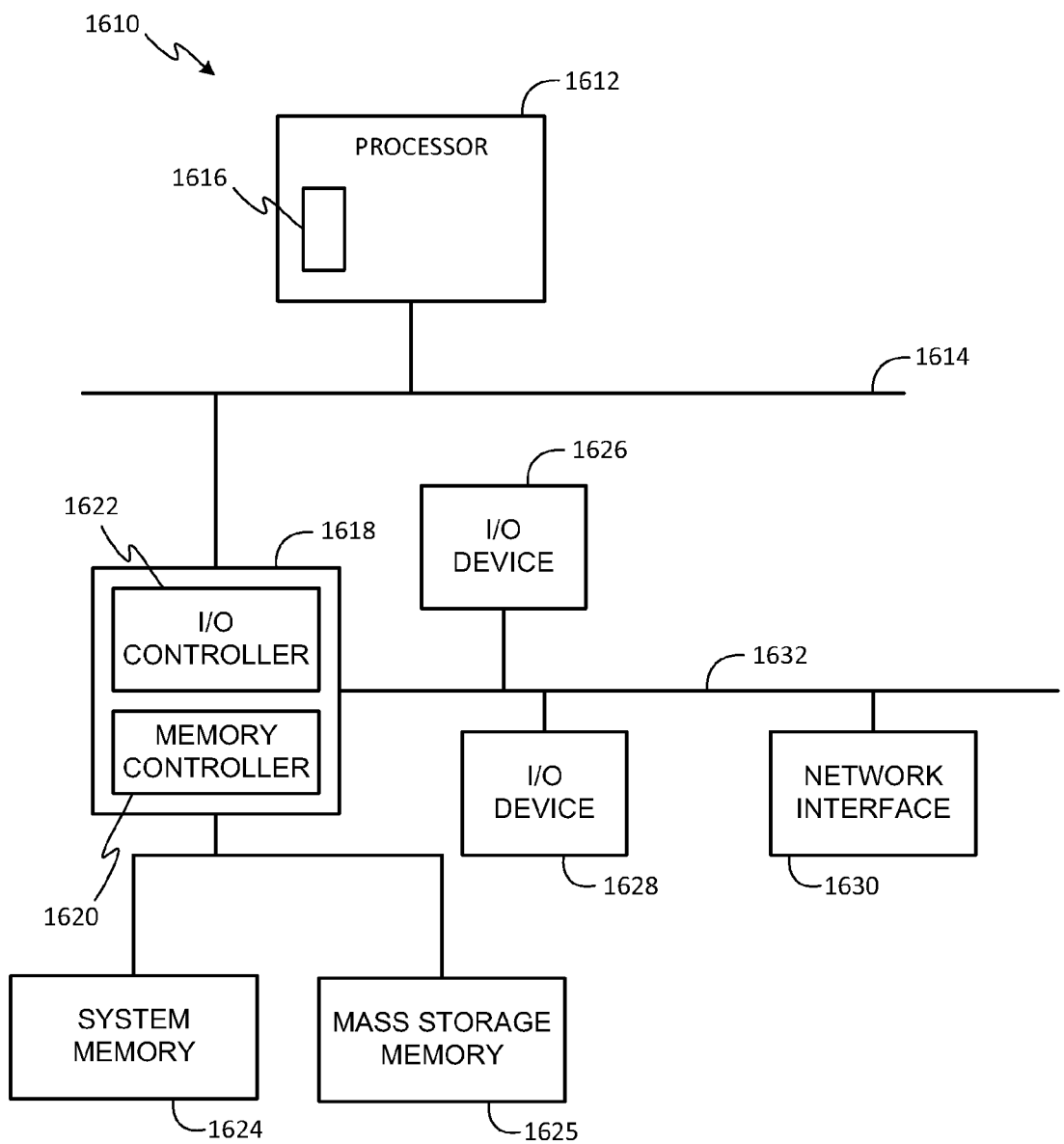
FIG. 16 is a block diagram of an example processor system that may be used to implement the example systems and methods described herein.

FIG. 16 is a block diagram of an example processor system 1610 that may be used to implement the apparatus and methods described herein. For example, processor systems similar or identical to the example processor system 1610 may be used to implement the workstation 102, the controller 104, the I/O card 132*a*, and/or the termination modules 124*a-c* and 126*a-c* of FIG. 1A. Although the example processor system 1610 is described below as including a plurality of peripherals, interfaces, chips, memories, etc., one or more of those elements may be omitted from other example processor systems used to implement one or more of the workstation 102, the controller 104, the I/O card 132*a*, and/or the termination modules 124*a-c* and 126*a-c*.

As shown in FIG. 16, the processor system 1610 includes a processor 1612 that is coupled to an interconnection bus 1614. The processor 1612 includes a register set or register space 1616, which is depicted in FIG. 16 as being entirely on-chip, but which could alternatively be located entirely or partially off-chip and directly coupled to the processor 1612 via dedicated electrical connections and/or via the interconnection bus 1614. The processor 1612 may be any suitable processor, processing unit or microprocessor. Although not shown in FIG. 16, the system 1610 may be a multi-processor system and, thus, may include one or more additional processors that are identical or similar to the processor 1612 and that are communicatively coupled to the interconnection bus 1614.

The processor 1612 of FIG. 16 is coupled to a chipset 1618, which includes a memory controller 1620 and a peripheral input/output (I/O) controller 1622. As is well known, a chipset typically provides I/O and memory management functions as well as a plurality of general purpose and/or special purpose registers, timers, etc. that are accessible or used by one or more processors coupled to the chipset 1618. The memory controller 1620 performs functions that enable the processor 1612 (or processors if there are multiple processors) to access a system memory 1624 and a mass storage memory 1625.

The system memory 1624 may include any desired type of volatile and/or non-volatile memory such as, for example, static random access memory (SRAM), dynamic random access memory (DRAM), flash memory, read-only memory (ROM), etc. The mass storage memory 1625 may include any desired type of mass storage device. For example, if the example processor system 1610 is used to implement the workstation 102 (FIG. 1A), the mass storage memory 1625 may include a hard disk drive, an optical drive, a tape storage device, etc. Alternatively, if the example processor system 1610 is used to implement the controller 104, one of the I/O cards 132*a-b* and 134*a-b*, or one of the termination modules 124a-c and 126a-c, the mass storage memory 1625 may include a solid-state memory (e.g., a flash memory, a RAM memory, etc.), a magnetic memory (e.g., a hard drive), or any other memory suitable for mass storage in the controller 104, the I/O cards 132a-b and 134a-b, or the termination modules 124a-c and 126a-c.

The peripheral I/O controller 1622 performs functions that enable the processor 1612 to communicate with peripheral input/output (I/O) devices 1626 and 1628 and a network interface 1630 via a peripheral I/O bus 1632. The I/O devices 1626 and 1628 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface 1630 may be, for example, an Ethernet device, an asynchronous transfer mode (ATM) device, an 802.11 device, a DSL modem, a cable modem, a cellular modem, etc. that enables the processor system 1610 to communicate with another processor system.

While the memory controller 1620 and the I/O controller 1622 are depicted in FIG. 16 as separate functional blocks within the chipset 1618, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. An apparatus, comprising:
   a base comprising:
      a first physical interface to be communicatively coupled to one of a first field device in a process control system or a second field device in the process control system; and
      a second physical interface to be communicatively coupled to a controller in the process control system via a bus; and
   a module to be removably attached to the base, the module to communicate with the first field device using a first communication protocol when the first physical interface is communicatively coupled to the first field device, the module to communicate with the second field device using a second communication protocol different than the first communication protocol when the first physical interface is communicatively coupled to the second field device, the module to communicate with the controller via the bus using a third communication protocol, the third communication protocol different from the first and second communication protocols.

2. The apparatus of claim 1, wherein at least one of the first communication protocol or the second communication protocol is a fieldbus protocol.

3. The apparatus of claim 1, wherein the first communication protocol is FOUNDATION fieldbus H1.

4. The apparatus of claim 3, wherein the second communication protocol is Profibus PA.

5. The apparatus of claim 3, wherein the first field device is FOUNDATION fieldbus H1 compliant and is communicatively coupled to the first physical interface in a point-to-point architecture without a segment protector.

6. The apparatus of claim 1, wherein at least one of the first communication protocol or the second communication protocol is WirelessHART.

7. The apparatus of claim 1, wherein at least one of the first communication protocol or the second communication protocol is based on an Internet protocol.

8. The apparatus of claim 1, wherein at least one of the first communication protocol or the second communication protocol is Message Queue Telemetry Transport.

9. The apparatus of claim 1, wherein at least one of the first communication protocol or the second communication protocol implements a tunnel protocol, wherein at least one of the corresponding first field device or the second field device is a safety device.

10. The apparatus of claim 1, wherein the module is to send a first request formatted according to the first communication protocol to the one of the first field device or the second field device and to send a second request formatted according to the second communication protocol to the one of the first field device or the second field device, the communication protocol associated with the one of the first field device or the second field device to be automatically detected based on a response to one of the first or second requests.

11. The apparatus of claim 1, further comprising a diagnostics analyzer to generate diagnostics information corresponding to an analysis of a physical layer and communications between the first physical interface and the one of the first field device or second field device.

12. The apparatus of claim 11, wherein the diagnostics information comprises measurements of at least one of supply voltage, load current, signal level, line noise, or jitter.

13. The apparatus of claim 1, wherein the third communication protocol is to communicate information on the bus from a second module in communication with the bus and in communication with the other one of the first field device or the second field device.

14. An apparatus, comprising:
    a base comprising:
       a first physical interface to be communicatively coupled to one of a first field device in a process control system or a second field device in the process control system; and
       a second physical interface to be communicatively coupled to a controller in the process control system via a bus; and
    a module to be removably attached to the base, the module to communicate with the first field device using a first communication protocol when the first physical interface is communicatively coupled to the first field device, the module to communicate with the second field device using a second communication protocol when the first physical interface is communicatively coupled to the second field device, the module to communicate with the controller via the bus using a third communication protocol, the third communication protocol different from the first and second communication protocols, the third communication protocol to communicate information on the bus from a second module in communication with the bus and in communication with the other one of the first field device or the second field device, the first physical interface of the base to be communicatively coupled to a third physical interface of a second base removably attached to the second module to enable peer-to-peer communications between the first and second field devices.

15. A method comprising:
receiving first information at a base having a first physical interface to be communicatively coupled to one of a first field device in a process control system or a second field device in the process control system;
at a module removably attached to the base, encoding the first information for communication using a first communication protocol, the first information communicated to the module from the first field device using a second communication protocol when the first physical interface is coupled to the first field device, the first information communicated to the module from the second field device using a third communication protocol different than the second communication protocol when the first physical interface is coupled to the second field device, the first communication protocol different from the second and third communication protocols; and
communicating the encoded first information from the module, via a second physical interface of the base, to a controller via a bus using the first communication protocol.

16. The method of claim 15, wherein the second communication protocol is Profibus PA and the third communication protocol is FOUNDATION fieldbus H1.

17. The method of claim 16, further comprising automatically detecting the second communication protocol or the third communication protocol associated with the one of the first field device or the second field device when the one of the first field device or the second field device is communicatively coupled to the first physical interface.

18. An apparatus, comprising:
a first interface to be communicatively coupled to one of a first field device in a process control system or a second field device in the process control system, the first interface to communicate using a first fieldbus communication protocol when coupled to the first field device and to communicate using a second fieldbus communication protocol different than the first fieldbus communication protocol when coupled to the second field device;
a communication processor communicatively coupled to the first interface, the communication processor to encode first information received from the one of the first field device or the second field device for communication via a bus using a third communication protocol different from the first and second fieldbus communication protocols; and
a second interface communicatively coupled to the communication processor and the bus to communicate the first information via the bus using the third communication protocol to a controller in the process control system, wherein the bus is to use the third communication protocol to communicate second information received from the other one of the first field device or the second field device.

19. The apparatus of claim 18, wherein the first field device is Profibus PA compliant and is communicatively coupled to the first interface in a point-to-point architecture without a DP/PA segment coupler.

* * * * *